(12) United States Patent
Lee et al.

(10) Patent No.: US 12,448,491 B2
(45) Date of Patent: Oct. 21, 2025

(54) NANO-PATTEREND CONDUCTIVE POLYMER SUBSTRATE WITH IMPROVED CELL ALIGNMENT, MATURITY, ADHESION, AND CONNECTIVITY AND METHOD FOR MANUFACTURING SAME

(71) Applicant: INDUSTRY FOUNDATION OF CHONNAM NATIONAL UNIVERSITY, Gwangju (KR)

(72) Inventors: Dong Weon Lee, Gwangju (KR); Yuyan Liu, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 556 days.

(21) Appl. No.: 17/949,694

(22) Filed: Sep. 21, 2022

(65) Prior Publication Data
US 2023/0348683 A1 Nov. 2, 2023

(30) Foreign Application Priority Data

Apr. 27, 2022 (KR) .................. 10-2022-0052069
Aug. 11, 2022 (KR) .................. 10-2022-0100721

(51) Int. Cl.
*C08J 7/044* (2020.01)
*C08K 7/06* (2006.01)
*C12N 5/077* (2010.01)

(52) U.S. Cl.
CPC ............... *C08J 7/044* (2020.01); *C08K 7/06* (2013.01); *C12N 5/0657* (2013.01); *C08J 2383/04* (2013.01); *C08K 2201/001* (2013.01); *C08K 2201/011* (2013.01)

(58) Field of Classification Search
CPC ........................................................ C08J 5/18
See application file for complete search history.

(56) References Cited

PUBLICATIONS

Proceedings of KSPE 2021 Spring Conference (Published on May 12, 2021).
AgNW-embedded and Nano-patterned PDMS Thin Film for Improved Adhesion and Connection of Cardiomyocytes (Published on Jan. 10, 2022).
The 35th IEEE International Conference on Micro Electromechanical System 2022 (Published on Jan. 10, 2022).
International Conference on Precision Engineering and Sustainable Manufacturing 2022 (Published on Jul. 21, 2022).
PRESM 2022 Poster 2 ( Published on Jul. 21, 2022).

*Primary Examiner* — Khanh T Nguyen
(74) *Attorney, Agent, or Firm* — Harness, Dickey & Pierce, P.L.C.

(57) ABSTRACT

Disclosed are a conductive polymer substrate and a method for manufacturing the same, wherein the conductive polymer substrate has improved cell alignment, maturity, adhesion, and connectivity by having nanopatterns on a surface thereof while having electric conductivity through embedded silver nanowires (AgNWs).

10 Claims, 33 Drawing Sheets

FIG. 9A

| Day | Without AgNW | AgNW Spin coat for 1 time | AgNW Spin coat for 2 times | AgNW Spin coat for 3 times |
|---|---|---|---|---|
| 7th | | | | |
| 8th | | | | |
| 9th | | | | |

NANO-PATTEREND CONDUCTIVE POLYMER SUBSTRATE WITH IMPROVED CELL ALIGNMENT, MATURITY, ADHESION, AND CONNECTIVITY AND METHOD FOR MANUFACTURING SAME

CROSS-REFERENCE TO RELATED APPLICATION

This application is based on and claims priority under 35 U.S.C. 119 to Korean Patent Application No. 10-2022-0052069, filed on Apr. 27, 2022, and Korean Patent Application No. 10-2022-0100721, filed on Aug. 11, 2022, in the Korean Intellectual Property Office, the disclosure of which is herein incorporated by reference in its entirety.

FIELD OF THE INVENTION

The present disclosure relates to a conductive polymer substrate and a method for manufacturing the same, wherein the conductive polymer substrate has improved cell alignment, maturity, adhesion, and connectivity by having nanopatterns on a surface thereof while having electric conductivity through embedded silver nanowires (AgNWs).

BACKGROUND

Cardiovascular diseases are leading causes of death globally. Nowadays, numerous of new drugs aim to conquer these diseases, but the process of development for new drugs has a high rate of failure, and thus in-vitro drug testing has gained attention due to its importance on the early stage of development. However, the original functions of adult cardiomyocytes cannot be thoroughly displayed by immature cardiomyocytes, and thus may show low reliability and accuracy in assessments. Therefore, new types of functional substrates for better cell culturing have received attention for mimicking natural cardiac tissue and for maturity enhancement, including long-term culturing, electrical and/or mechanical stimulation and morphology.

It takes several years for cardiomyocytes to fully mature in vivo, which inspired the idea of prolonging culture time for better maturation. Long-term culturing allowed cardiomyocytes to show more mature phenotypes, but high-cost and time-consuming raise questioning about the possibility of wide application of long-term culturing. Electrical and mechanical stimulation can initiate and coordinate cellular contraction, which regulates cell structures and functions during development. However, additional stimulation brings difficulties in deciding appropriate parameters, such as the amplitudes and duration of the stimulations.

Morphology is an appealing method to enhance cell maturity in the past decades. Single adult cardiomyocytes typically exhibit an elongated cell body with a length to width ratio of 7:1. To mimic this original morphology of cardiomyocytes, there are many studies on patterned culture substrate.

Many studies have reported successful cases of the application of conductive biomaterials to promote the maturation of cardiomyocytes. By applying conductive materials, cell-to-cell communications were quickly established and the maturity of cardiomyocytes was improved. The most common conductive materials include conductive polymers or conductive fillers including metal-based and carbon-based fillers. Conductive polymers are easily broken, failing to reproduce mechanical characteristics of natural heart tissue, and carbon-based materials cause the problem of dispersion, opaqueness, and toxicity. Consequently, fillers based on metals, such as gold and silver, have received more attention. Gold nanowires have an advantage of being biocompatible, but are expensive and difficult to synthesize in a large range. Instead, silver nanowires (AgNWs) are superior due to electrical conductivity, high flexibility, and ease to synthesis thereof. Though sliver exhibits the highest conductivity among all metals, the high oxidation thereof restricts its application to biomaterials, and moreover, the oxidation of silver is a cause of toxicity, so that researchers are committed to reducing the oxidation.

There is a lot of research about materials, such as graphene oxide (GO), gold, nickel (Ni), platinum (Pt), and palladium (Pd), to coat a protection layer on silver nanowires. A very thin graphene oxide layer has been reported for the prevention of the oxidation of silver nanowires, and the silver nanowires, which are oxidized within two weeks without an oxide graphene protection thin film, were stable even in the exposure to the air for over two months when coated with graphene oxide. Similarly, Au—Ag core-sheath nanowires confer high conductivity and oxidation resistance by combining the benefits of silver and gold. However, the application of such coatings is complicated and expensive.

Therefore, there is an urgent need to develop a conductive polymer substrate capable of preventing the generation of toxicity of silver nanowires while simply and sufficiently utilizing electric conductivity of silver nanowires.

SUMMARY

The present inventors improved connectivity of respective cardiomyocytes by utilizing a nano-structure containing silver nanowires to form a conductive silver nanowire (AgNW) network protected with polydimethylsiloxane (PDMS) and expose one end of the silver nanowires to the surface. Meanwhile, the present inventors discovered that, as a result of applying nanogrooves with a predetermined width to the conductive polymer substrate, the cell growth direction can be aligned.

That is, the present inventors confirmed that the use of the conductive polymer substrate and the manufacturing method therefor of the present disclosure can prevent the oxidation of silver nanowires in a cell culture medium and provide better cell alignment, maturation, and cell-to-cell communication.

Accordingly, an aspect of the present disclosure is to provide a method for manufacturing a conductive polymer substrate.

Another aspect of the present disclosure is to provide a conductive polymer substrate including a nanopatterned layer on one side thereof, a conductive material being embedded in the nanopatterned layer.

The present disclosure relates to a conductive polymer substrate having silver nanowires embedded in polydimethylsiloxane and a method for manufacturing the same and, specifically, to a conductive polymer substrate and a method for manufacturing the same, wherein the conductive polymer substrate has electric conductivity as well as prevents silver nanowire toxicity by silver nanowires (AgNW) embedded in polydimethylsiloxane (PDMS) and can culture cell bodies with improved cell adhesion, alignment, maturation, and intercellular connectivity by including nanopatterns for cell alignment on the surface of the conductive polymer substrate.

Hereinafter, the present disclosure will be described in more detail.

In accordance with an aspect of the present disclosure, there is provided a method for manufacturing a conductive polymer substrate, the method comprising:
   a first preparation step of preparing a first mold including a nanopatterned layer with a predetermined pitch distance on a surface thereof;
   a second preparation step of bringing the first mold into contact with a first polymer material, followed by detachment of the first mold, so as to allow the first polymer material to have nanopatterns corresponding to nanopatterns of the first mold, and then curing the first polymer material to prepare a second mold having transferred nanopatterns;
   a third preparation step of bringing the second mold into contact with a second polymer material, followed by detachment of the second mold, so as to allow the second material to have nanopatterns corresponding to the nanopatterns of the second mold, and then curing the second polymer material to prepare a polymer substrate having transferred nanopatterns;
   a first coating step of spin-coating a conductive material on the polymer substrate having a nanopatterned layer on one side of the polymer substrate;
   a second coating step of spin-coating a first polymer material on the conductive material-spin-coated side of the polymer substrate so as to allow the conductive material to be embedded in the first polymer material; and
   a removal step of removing the polymer substrate.

In the present disclosure, in the first preparation step, a first mold including a nanopatterned layer with a predetermined pitch distance on a surface thereof may be prepared.

In the present disclosure, the nanopatterns may have a shape in which pitches and grooves are alternatingly arranged.

In the present disclosure, the pitch may refer to a ridge continuing from one end to the other end of the polymer substrate, but is not limited thereto.

In the present disclosure, the groove may refer to a valley between ridges continuing from one end to the other end of the polymer substrate being spaced apart by a predetermined distance, but is not limited thereto.

In the present disclosure, the distance between the pitches may be 400 to 1,200 nm, 400 to 1,100 nm, 400 to 1,000 nm, 400 to 900 nm, 400 to 800 nm, 500 to 1,200 nm, 500 to 1,100 nm, 500 to 1,000 nm, 500 to 900 nm, 500 to 800 nm, 600 to 1,200 nm, 600 to 1,100 nm, 600 to 1,000 nm, 600 to 900 nm, 600 to 800 nm, 700 to 1,200 nm, 700 to 1,100 nm, 700 to 1,000 nm, 700 to 900 nm, or 700 to 800 nm, and for example, 700 to 800 nm, but is not limited thereto.

In the present disclosure, in the second preparation step, the first mold may be brought into contact with a first polymer material, followed by detachment of the first mold of the first mold, so as to allow the first polymer material to have nanopatterns corresponding to nanopatterns of the first mold, and then the first polymer material may be cured to prepare a second mold having transferred nanopatterns.

In the present disclosure, the first polymer material may be one selected from the group consisting of polydimethylsiloxane (PDMS)-based polymers, polymethyl methacrylate (PMMA), polyurethane acrylate (PUA), polystyrene (PS), polycarbonate (PC), polyvinyl alcohol (PVA), cyclic olefin copolymer (COP), polyethylene terephthalate (PET), polyvinyl butadiene (PVB), and copolymers thereof, and for example, PDMS, but is not limited thereto.

In the present disclosure, in the third preparation step, the second mold may be brought into contact with a second polymer material, followed by detachment of the second mold, so as to allow the second material to have nanopatterns corresponding to the nanopatterns of the second mold, and then the second polymer material may be cured to prepare a polymer substrate having transferred nanopatterns.

In the present disclosure, the second polymer material may be one selected from the group consisting of polydimethylsiloxane (PDMS)-based polymers, polymethyl methacrylate (PMMA), polyurethane acrylate (PUA), polystyrene (PS), polycarbonate (PC), polyvinyl alcohol (PVA), cyclic olefin copolymer (COP), polyethylene terephthalate (PET), polyvinyl butadiene (PVB), and copolymers thereof, and for example, PVA, but is not limited thereto.

The method for manufacturing a conductive polymer substrate of the present disclosure can prevent the damage to the nanopatterned layer or the elongation of the silver nanowires in the polymer substrate by using the second mold, compared with by directly introducing the first mold containing the nanopatterned layer into the polymer substrate to transfer the nano-pattered layer.

In the present disclosure, in the first coating step, the conductive material may be spin-coated on the nano-pattered layer of the polymer substrate to which the nanopatterned layer has been transferred.

In the present disclosure, the first coating step may be performed by primary spin coating at 400 to 600 rpm for 5 to 15 sec and then secondary spin coating at 2,500 to 3,500 rpm for 20 to 40 sec, but is not limited thereto.

In the present disclosure, the first coating step may be performed at least one time, two times, three times, four times, or five times, and for example, two times, but is not limited thereto.

In the present disclosure, in the first coating step, the conductive material can be uniformly coated on the nanopatterned layer of the polymer substrate when the first coating step is repeated at least two times by using a low-concentration conductive material rather than when the first coating step is performed only one time by using a high-concentration conductive material. In addition, such a coating manner is useful in integrating the conductive material on the nanopatterned layer.

In the present disclosure, the conductive material may be contained in an ethanol suspension, but is not limited thereto.

In the present disclosure, the concentration of the conductive material contained in the suspension may be 0.1 to 10.0 mg/mL, 0.1 to 9.0 mg/mL, 0.1 to 8.0 mg/mL, 0.1 to 7.0 mg/mL, 0.1 to 6.0 mg/mL, 0.1 to 5.0 mg/mL, 0.1 to 4.0 mg/mL, 0.1 to 3.0 mg/mL, 0.1 to 2.0 mg/mL, 0.1 to 1.0 mg/mL, 0.1 to 0.9 mg/mL, 0.1 to 0.8 mg/mL, 0.1 to 0.7 mg/mL, 0.1 to 0.6 mg/mL, 0.1 to 0.5 mg/mL, 0.1 to 0.4 mg/mL, or 0.1 to 0.3 mg/mL, and for example, 0.2 mg/mL, but is not limited thereto.

In the present disclosure, the conductive material may be at least one selected from the group consisting of silver nanowires, copper nanowires, and gold nanowires, and for example, silver nanowires, but is not limited thereto.

In the present disclosure, in the second coating step, the first polymer material may be spin-coated on the conductive material-spin-coated side of the polymer substrate so as to allow the conductive material to be embedded in the first polymer material.

In the present disclosure, the second coating step may be performed at 500 to 900 rpm for 30 to 50 sec, but is not limited thereto.

In the present disclosure, in the removal step, the polymer substrate may be removed.

In the present disclosure, the removal step may be performed by soaking in deionized water (DI water) the polymer substrate having the conductive material and the first polymer material laminated therein, but is not limited thereto.

In the present disclosure, the method for manufacturing a conductive polymer substrate may further include a plasma treatment step of treating the conductive material-spin-coated polymer substrate with oxygen (O2) plasma, but is not limited thereto.

In accordance with another aspect of the present disclosure, there is provided a conductive polymer substrate including a nanopatterned layer one side thereof, a conductive material being embedded in the nanopatterned layer.

In the present disclosure, the diameter of the conductive material may be 5 to 40 nm, 5 to 35 nm, 5 to 30 nm, 5 to 25 nm, 10 to 40 nm, 10 to 35 nm, 10 to 30 nm, 10 to 25 nm, 15 to 40 nm, 15 to 35 nm, 15 to 30 nm, or 15 to 25 nm, and for example, 15 to 25 nm, but is not limited thereto.

In the present disclosure, the length of the conductive material may be 5 to 40 μm, 5 to 35 μm, 5 to 30 μm, 5 to 25 μm, 10 to 40 μm, 10 to 35 μm, 10 to 30 μm, 10 to 25 μm, 15 to 40 μm, 15 to 35 μm, 15 to 30 μm, or 15 to 25 μm, and for example, 15 to 25 um, but is not limited thereto.

In the present disclosure, the nanopatterns included in one side of the conductive polymer substrate may have a shape in which pitches and grooves are alternatingly arranged, but is not limited thereto.

In the present disclosure, the distance between the pitches of the nanopatterns included in one side of the conductive polymer substrate may be 400 to 1,200 nm, 400 to 1,100 nm, 400 to 1,000 nm, 400 to 900 nm, 400 to 800 nm, 500 to 1,200 nm, 500 to 1,100 nm, 500 to 1,000 nm, 500 to 900 nm, 500 to 800 nm, 600 to 1,200 nm, 600 to 1,100 nm, 600 to 1,000 nm, 600 to 900 nm, 600 to 800 nm, 700 to 1,200 nm, 700 to 1,100 nm, 700 to 1,000 nm, 700 to 900 nm, or 700 to 800 nm, and for example, 700 to 800 nm, but is not limited thereto.

The present disclosure relates to a functional polydimethylsiloxane (PDMS) conductive polymer substrate including nanopatterns on the surface while having electric conductivity by embedded silver nanowires (AgNWs) and to a method for manufacturing the same, and the use of the conductive polymer substrate fabricated by the manufacturing method of the present disclosure can prevent the toxicity problem of silver nanowires by allowing the silver nanowires to be embedded in polydimethylsiloxane and can culture cell bodies with improved cell adhesion, alignment, maturation, and intercellular connectivity.

BRIEF DESCRIPTION OF THE DRAWINGS

FIGS. 9A, 9B, 9C and 9D show cell adhesion of neonatal rat ventricular myocytes over the cell culture time in bare PDMS and AgNW on PDMS according to one experimental example of the present disclosure.

DETAILED DESCRIPTION OF THE EXEMPLARY EMBODIMENTS

Hereinafter, the present disclosure will be described in more detail with reference to exemplary embodiments. These exemplary embodiments are provided only for the purpose of illustrating the present disclosure in more detail, and therefore, according to the purpose of the present disclosure, it would be apparent to a person skilled in the art that these exemplary embodiments are not construed to limit the scope of the present disclosure.

Preparative Example: Fabrication of Conductive Polymer Substrates

Figure 1:
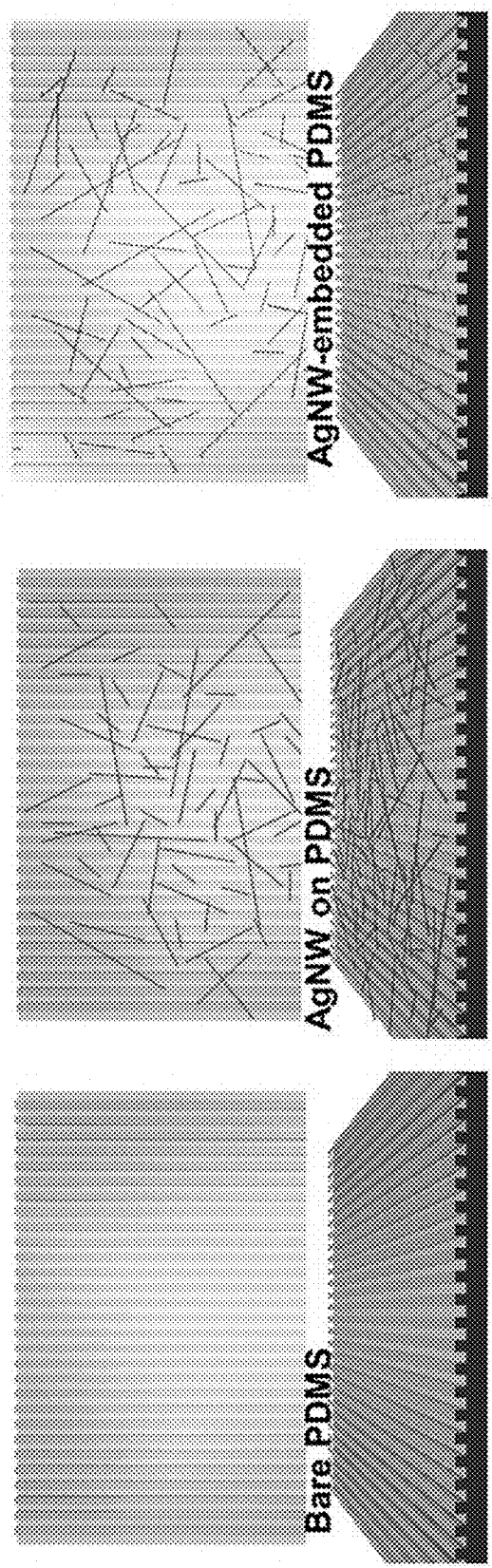
FIG. 1 schematically shows bare PDMS, AgNW on PDMS, and AgNW-embedded PDMS fabricated according to one preparative example of the present disclosure.

A total of three different conductive polymer substrates, which were bare PDMS, AgNW on PDMS, and AgNW-embedded PDMS, were prepared. Schematic diagrams of the proposed three different thin films are shown in FIG. 1.

All the polydimethylsiloxane (PDMS) thin films were formed with a nanogroove pitch distance of 800 nm, and the size of silver nanowires (AgNWs) was within about 20 nm in diameter and within about 20 μm in length. The bare PDMS thin film used as a control was prepared using a nanopatterned polyurethane acrylate (PUA) mold, and the polydimethylsiloxane thin films incorporated with silver nanowires were prepared by using two methods, spin-coat and transfer methods.

As for the spin-coat method, an ethanol suspension containing 0.2 mg/mL silver nanowires was spin-coated onto the polydimethylsiloxane thin film at 500 rpm for 10 sec, followed by spin coating at 3000 rpm for 30 sec, thereby obtaining AgNW on PDMS. As for the transfer method, water-soluble polyvinyl alcohol (PVA) was applied as a sacrificial layer to transfer nanogroove patterns and silver nanowires.

First, a thick polydimethylsiloxane mold was prepared using a conventional micromolding method. A base agent and a curing agent for polydimethylsiloxane were mixed at a weight ratio of 10:1. The polydimethylsiloxane mixture was then poured onto a polyurethane acrylate (PUA) mold with nanogrooves. The air bubbles were completely removed in a vacuum desiccator for 40 min, and then the polydimethylsiloxane thin film was cured on a hotplate at temperature conditions of 80° C. for 2 h. After the curing, the thick polydimethylsiloxane mold was released from the polyurethane acrylate mold carefully.

Secondarily, 0.5 mL of a 40% polyvinyl alcohol (PVA) solution was dropped onto a silicon wafer, and then the thick polydimethylsiloxane mold with nanogrooves was placed onto the dropped polyvinyl alcohol, and pressure was applied to the thick polydimethylsiloxane mold to transfer nanopatterns from polydimethylsiloxane to the water-soluble polyvinyl alcohol thin film. The polyvinyl alcohol thin film was completely cured on a hotplate at 115° C. for 12 h, and then the thick polydimethylsiloxane mold was detached from the polyvinyl alcohol thin film with nanogrooves. This method was effective and simple to transfer nanogroove patterns. The reason was that polydimethylsiloxane is silicone rubber-based and is easy to detach by pressure after pattern transfer, but the detachment of the mold is difficult when pattern transfer is performed by directly using the polyvinyl alcohol.

Third, a silver nanowire suspension was spin-coated on the polyvinyl alcohol thin film. To prepare a suspension having uniformly dispersed silver nanowires, pure silver nanowires (1 mg/mL) and ethanol were mixed at a ratio of 20:80. Thereafter, the suspension was placed in an ultrasonicator for 10 min. Since polyvinyl alcohol may be damaged by reaction with water due to its solubility in water but does not react with ethanol, spin coating can be performed while the silver nanowire suspension is prevented from damaging the polyvinyl alcohol nanogroove patterns. The silver nanowire suspension was spin-coated on the polyvinyl alcohol nanogrooves at 500 rpm for 10 sec, followed by spin coating at 3000 rpm for further 30 sec. Therefore, a polyvinyl alcohol nanogroove layer with uniformly distributed silver nanowires can be obtained.

Lastly, to fabricate the polydimethylsiloxane thin film, a mixture in which a base agent and a curing agent were mixed at a weight ratio of 10:1 was prepared, and then spin coating using the mixture was performed on the polyvinyl alcohol thin film with silver nanowires at 700 rpm for 40 sec, followed by curing on a hotplate at temperature conditions of 80° C. for 2 h. The cured product was soaked in DI water for 5 h to fully dissolve the polyvinyl alcohol thin film therein, thereby fabricating a AgNW-embedded PDMS thin film.

Figure 2:
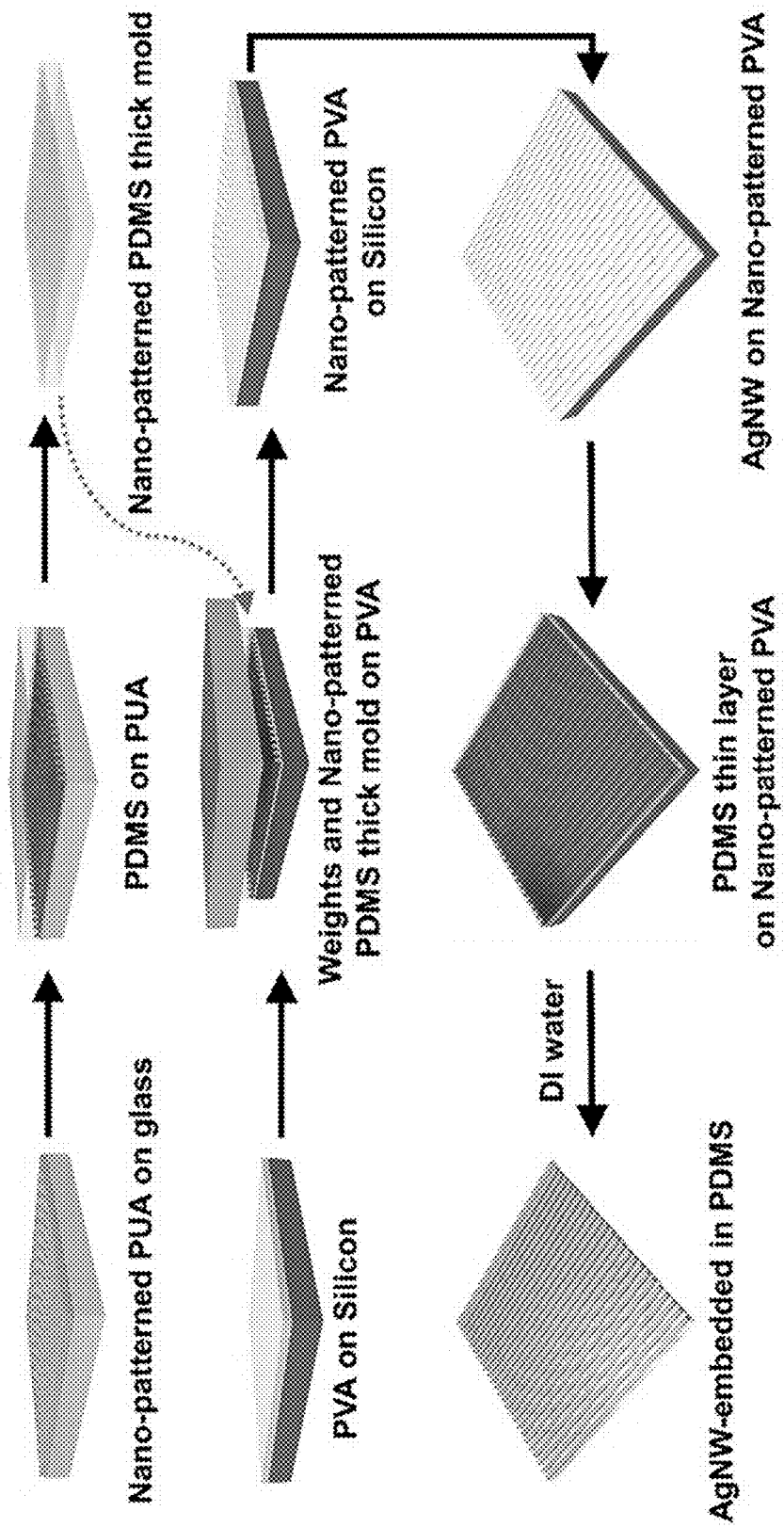
FIG. 2 schematically shows a process for fabricating AgNW-embedded PDMS according to one preparative example of the present disclosure.

The polyvinyl alcohol was dissolved using DI water, so that the stretching of nanogrooves and silver nanowires and unexpected damage to the thin film can be prevented during the removal of the thick polydimethylsiloxane nanogroove mold. The whole schedule is shown FIG. 2.

Experimental Example 1: Analysis of Thin Film 1-1. Surface Analysis

The results of observing different surface structures of the three different thin films by using field-emission scanning electron microscopy (FE-SEM) are shown in FIGS. 3A to 3F.

Figure 3A:
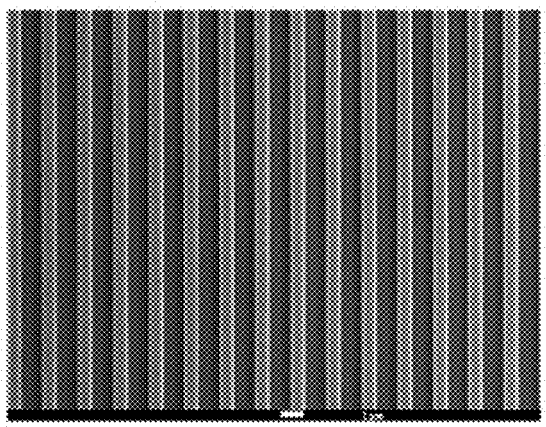
FIGS. 3A, 3B, 3C, 3D, 3E and 3F shows field-emission scanning electron microscopy (FE-SEM) images of different surface structures of PDMS thin films fabricated according to one preparative example of the present disclosure.
Figure 3A:
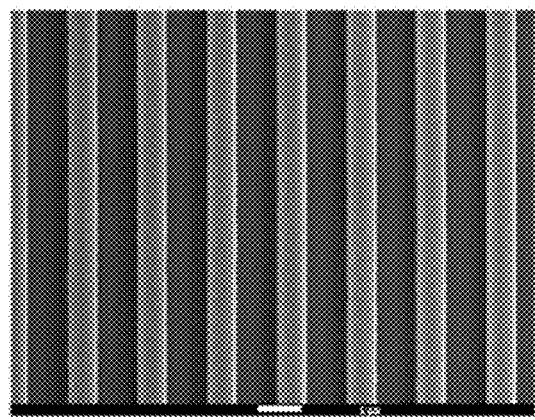
Figure 3A:
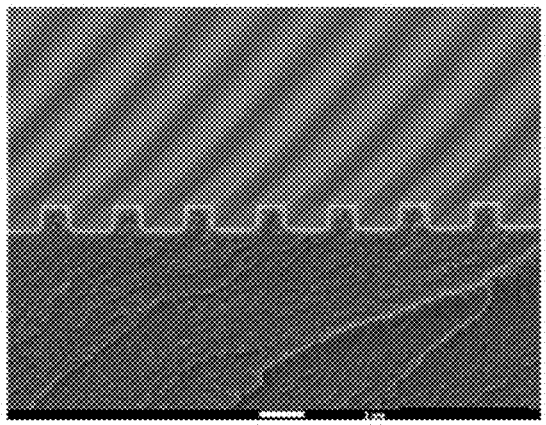
Figure 3A:
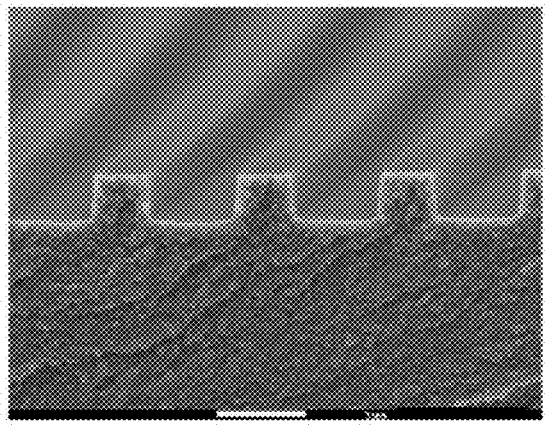
Figure 3B:
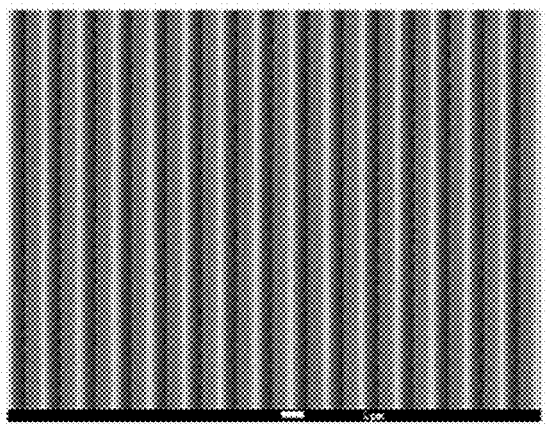
Figure 3B:
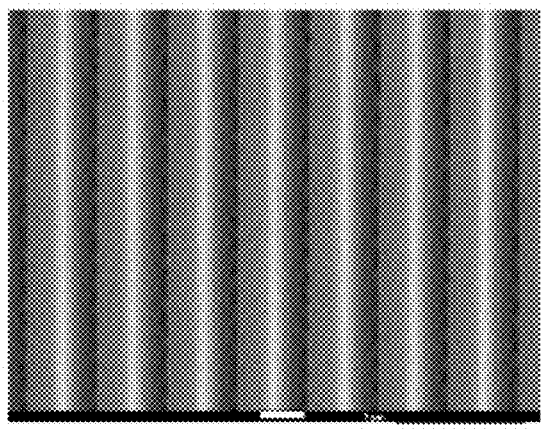
Figure 3B:
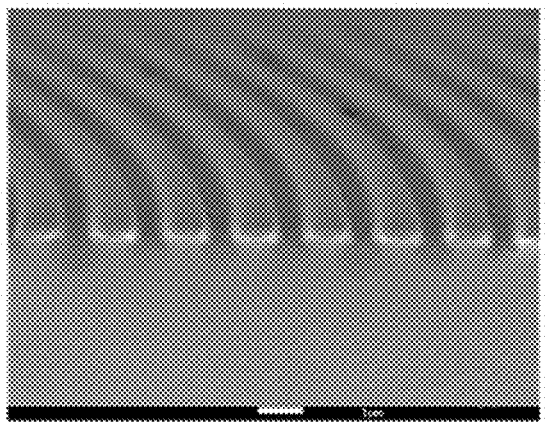
Figure 3B:
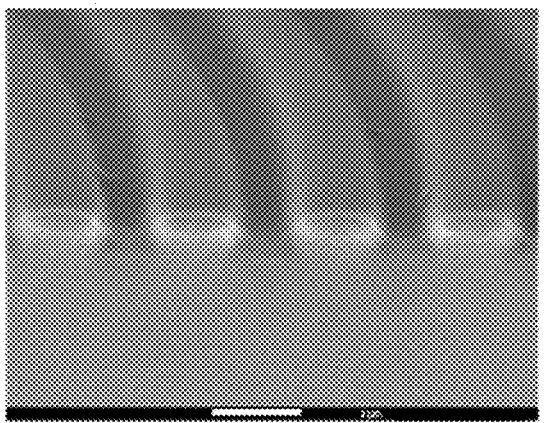
Figure 3C:
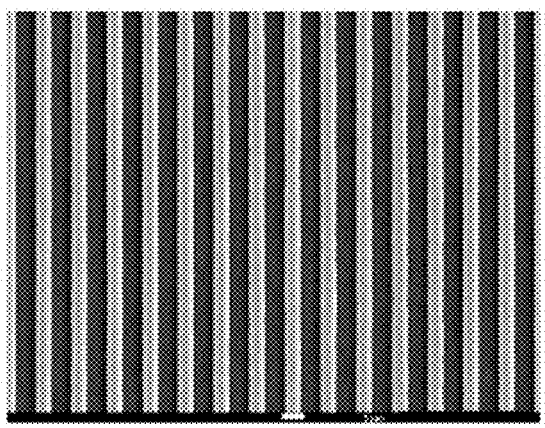
Figure 3C:
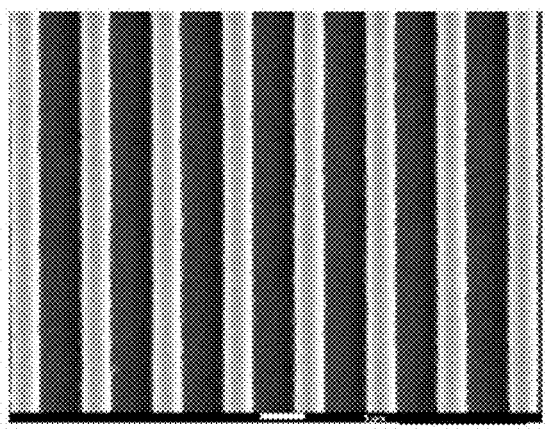
Figure 3C:
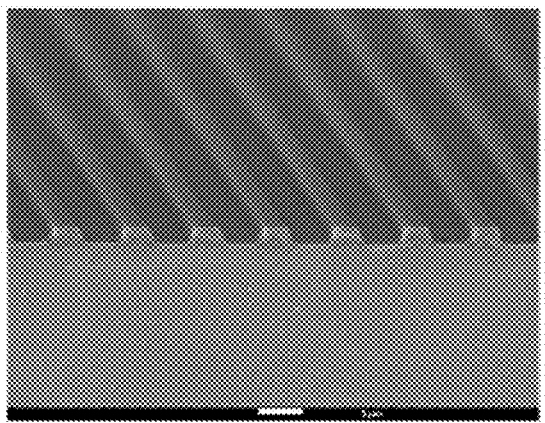
Figure 3C:
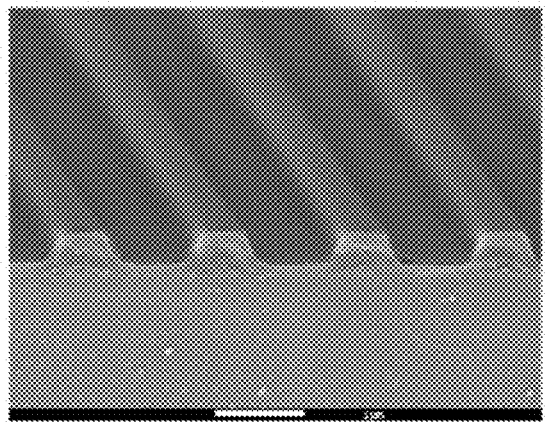
Figure 3D:
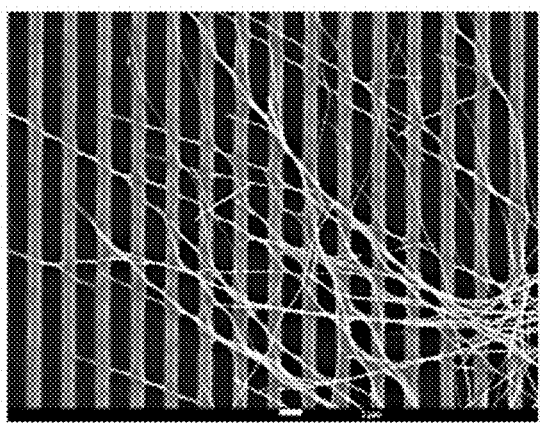
Figure 3D:
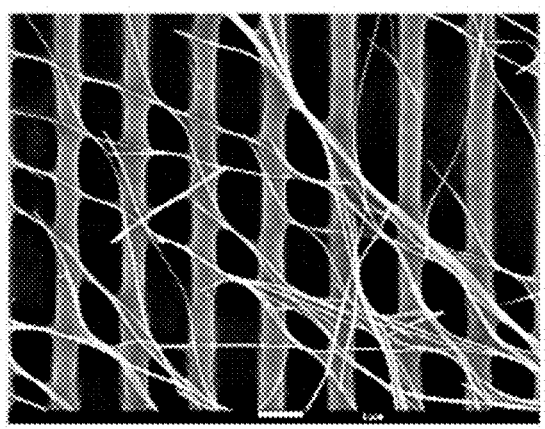
Figure 3D:
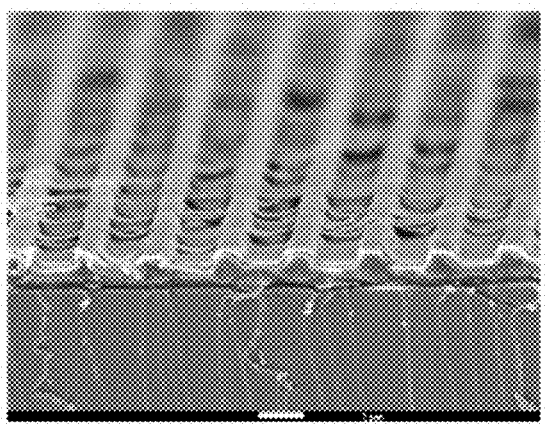
Figure 3D:
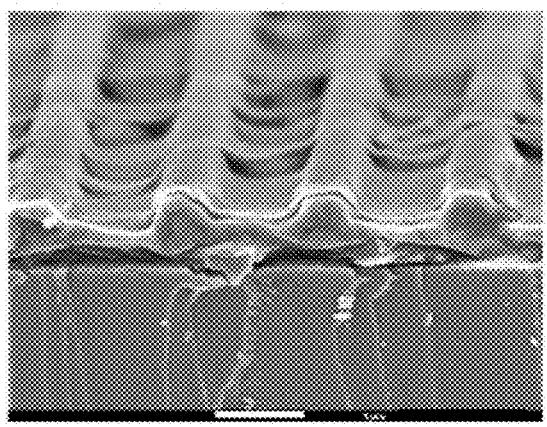
Figure 3E:
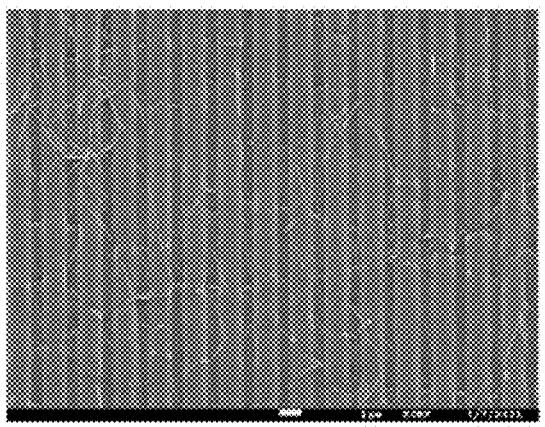
Figure 3E:
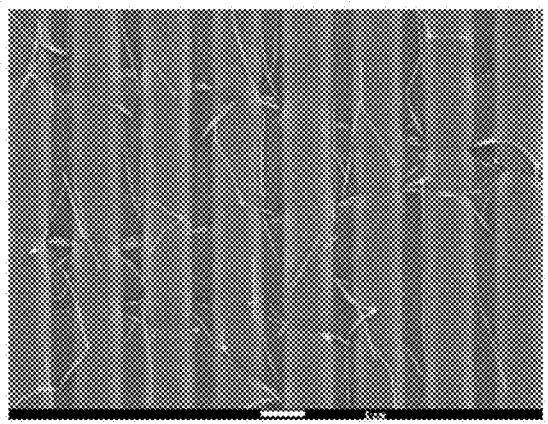
Figure 3E:
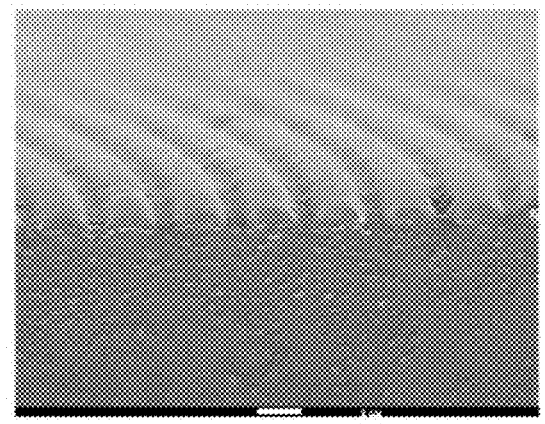
Figure 3E:
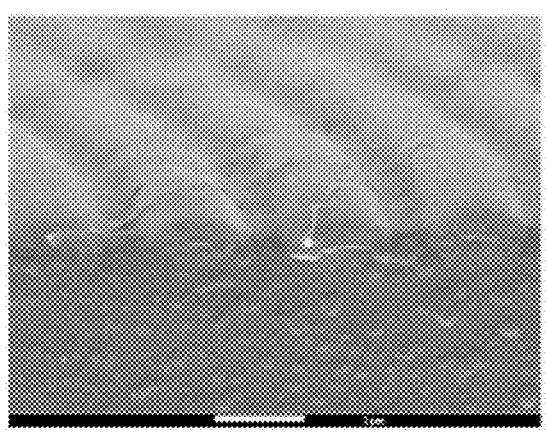
Figure 3F:
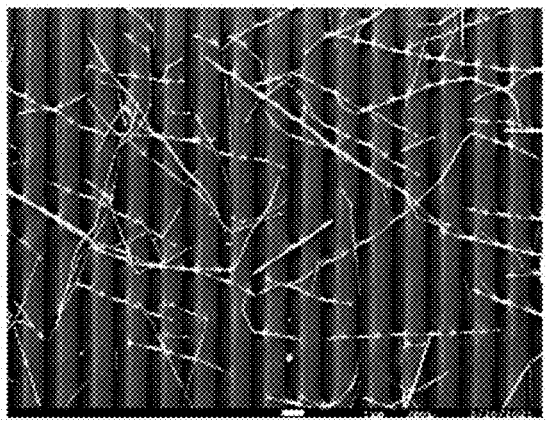
Figure 3F:
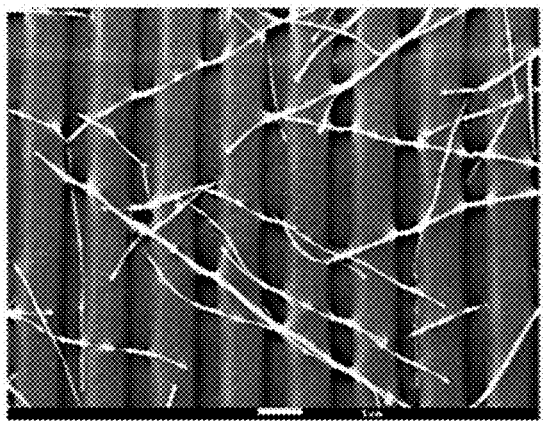
Figure 3F:
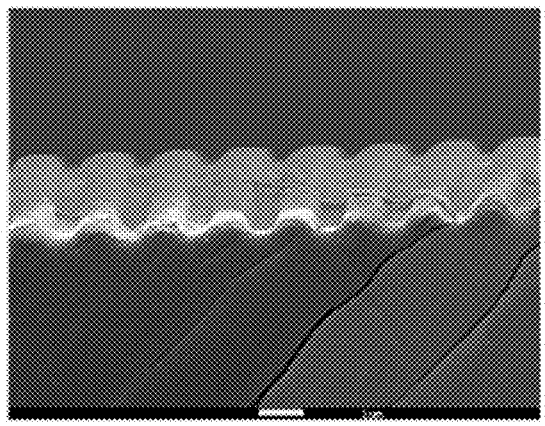
Figure 3F:
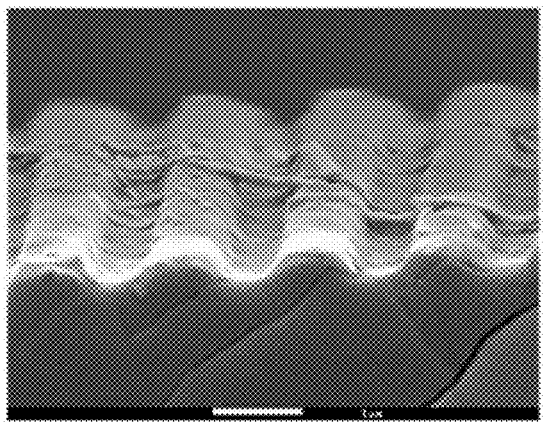

As can be confirmed in FIGS. 3A to 3F, the nanogrooves of all the polydimethylsiloxane thin films were 800 nm in width, length, and depth, and optimized for cardiomyocyte culturing. FIG. 3A shows a polyurethane acrylate mold and FIG. 3B shows a polydimethylsiloxane mold. FIG. 3C shows a water-soluble polyvinyl alcohol thin film to which nanogrooves are transferred from the polydimethylsiloxane mold. FIG. 3D shows spin-coated silver nanowires. FIG. 3E shows AgNW-embedded PDMS fabricated using the silver nanowires in FIG. 3D and FIG. 3F shows AgNW on PDMS fabricated using the same.

In the AgNW-embedded PDMS, most of the silver nanowires were embedded in polydimethylsiloxane, and some of the silver nanowires were exposed to the surface to provide the connection between cardiac cells. Such an embedded structure can ensure cell connectivity and maximize cell protection function.

Figure 4A:
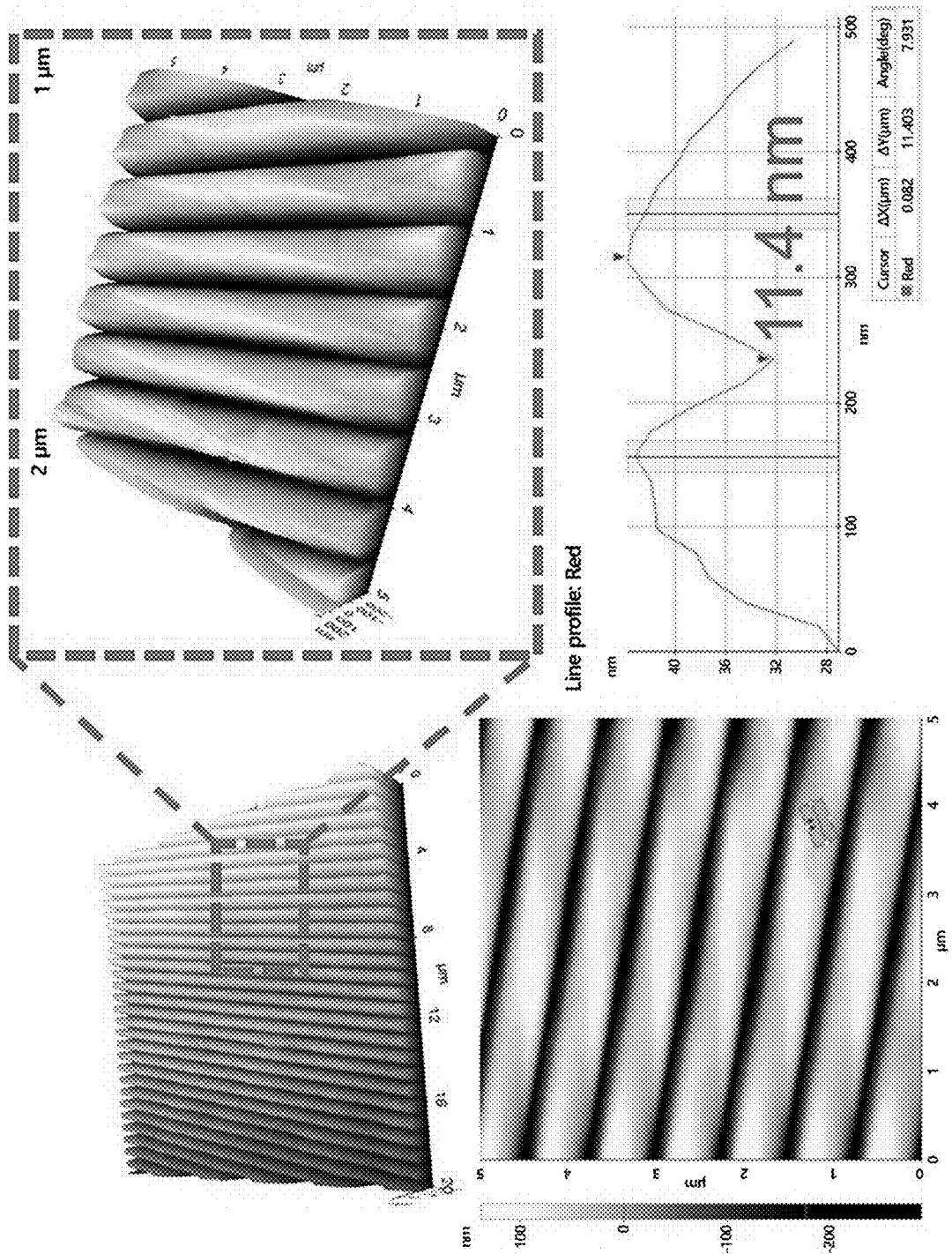
FIGS. 4A and 4B show atomic force microscopy (AFM) images of comparing different surface structures of PDMS thin films fabricated according to one preparative example of the present disclosure.
Figure 4B:
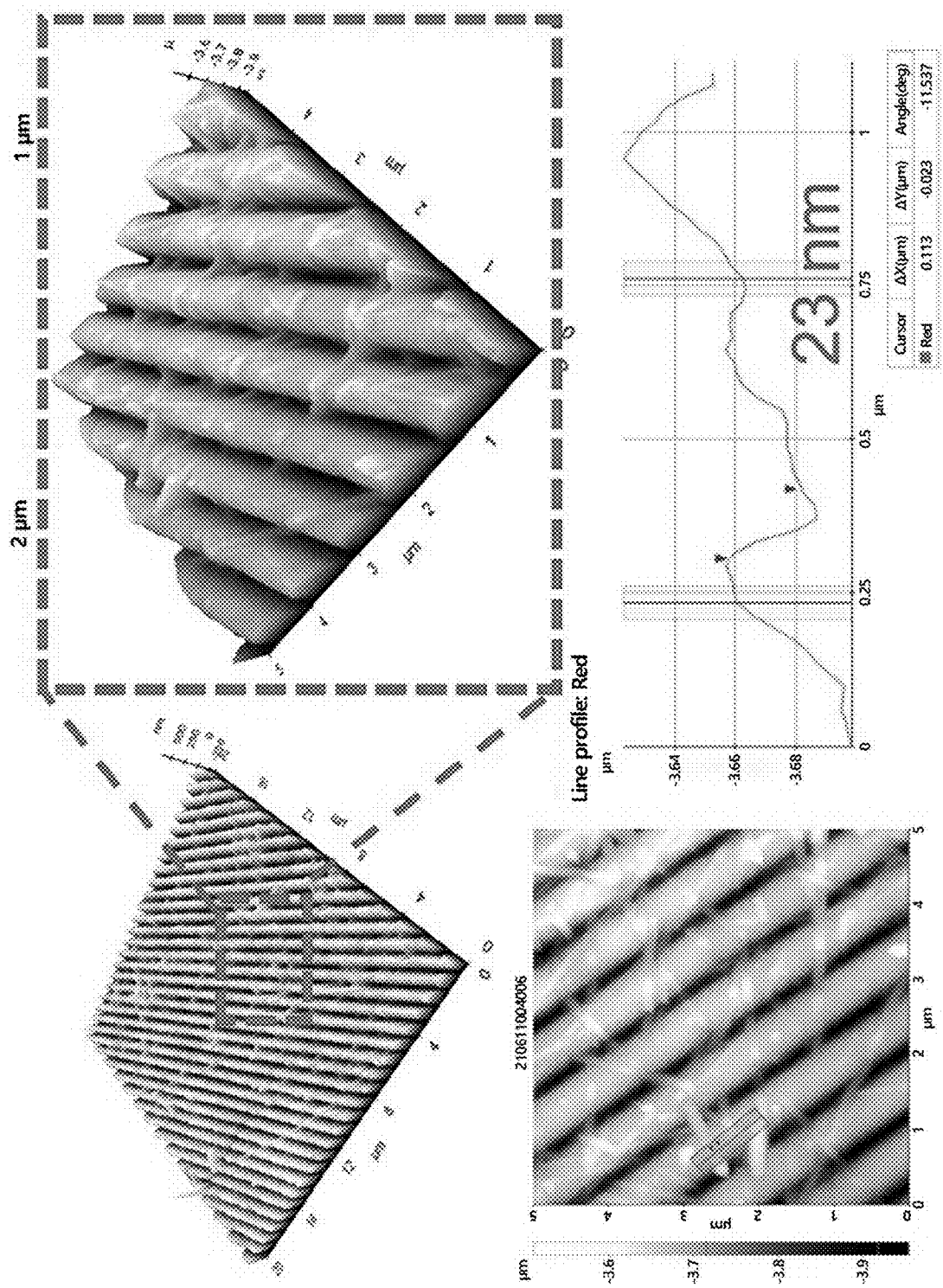

The comparison results of AgNW on PDMS and AgNW-embedded PDMS thin films through atomic force microscopy (AFM) are shown in FIGS. 4A and 4B.

As can be confirmed in FIGS. 4A and 4B, there was a marked difference in thin film surface morphology. As investigated through level measurement, a different value unlike in the diameter of pure silver nanowires was measured in the AgNW-embedded PDMS thin film. This proves that the silver nanowires were embedded in the polydimethylsiloxane thin film.

1-2. Oxidation Analysis

Figure 5:
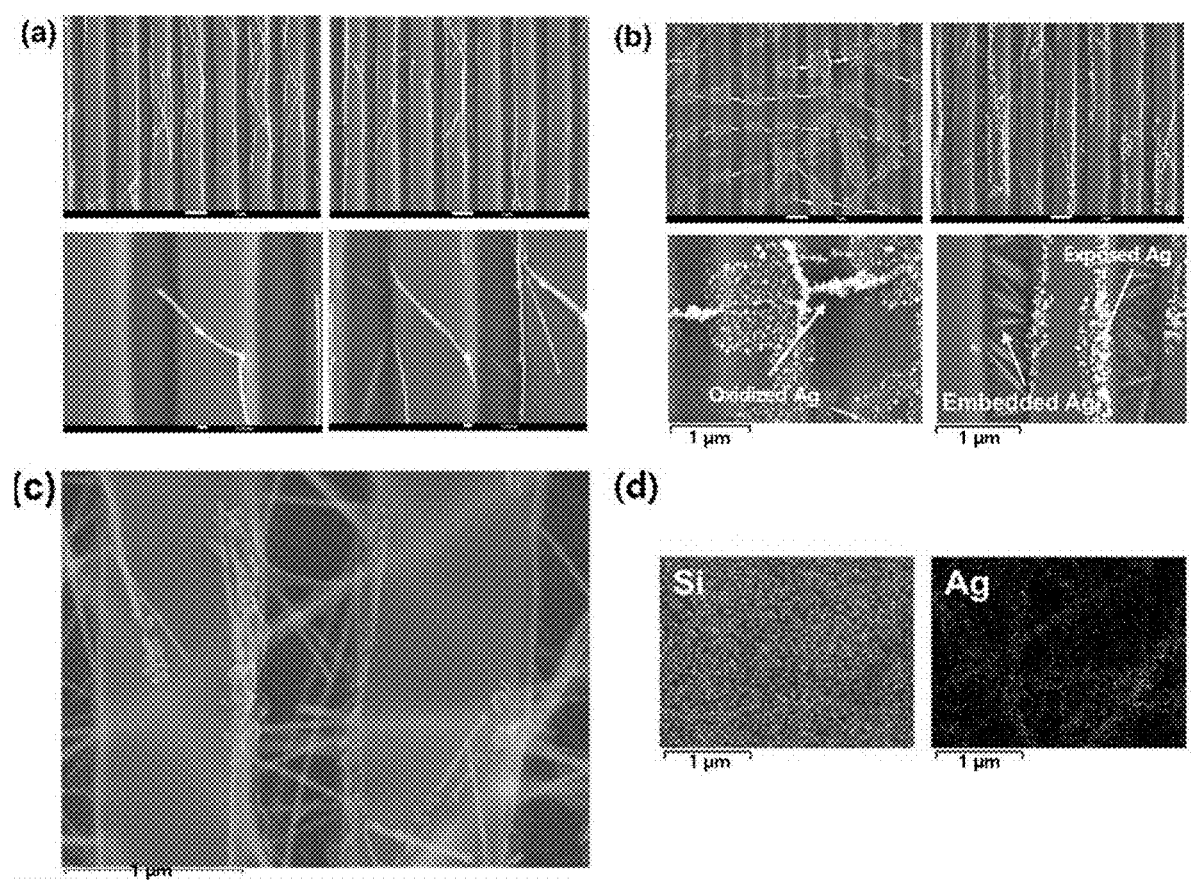
FIG. 5 shows the experimental results on silver nanowires exposed to an oxygen-rich environment according to one experimental example of the present disclosure.

To examine the long-term protection ability of the embedded structure, O2 plasma treatment was conducted. FIG. 5 shows the experimental results on silver nanowires exposed to an oxygen-rich environment. (a), (b), and (c) show enlarged images of silver nanowires of AgNW on PDMS, AgNW-embedded PDMS, and PDMS surfaces, respectively.

As can be confirmed from (a) and (b) of FIG. 5, as a results of treating the AgNW on PDMS and AgNW-embedded PDMS thin films with O2 plasma at 25 W for 1 min, some of silver nanowires closest to the thin film surfaces were changed into oxides.

By the O2 plasma treatment for 5 min, the silver nanowires of the AgNW on PDMS thin film was much more oxidized, but the silver nanowires of the AgNW-embedded PDMS were partially oxidized. The silver nanowires in ridge parts showed severe oxidation, but the silver nanowires in groove parts maintained the original thin and long wire shape. This indicates that the thin polydimethylsiloxane layer in which the silver nanowires were embedded prevented the oxidation of the silver nanowires.

Referring to (c) and (d) of FIG. 5, it could be confirmed through fluorescence that silicon atoms (Si) and silver atoms (Ag) were present on the surface of the PDMS thin film. The partial exposure of silver atoms indicates that most of the silver nanowires were embedded in the polydimethylsiloxane layer and only some of the silver nanowires were exposed.

1-3. Hydrophilicity Analysis

Figure 6:
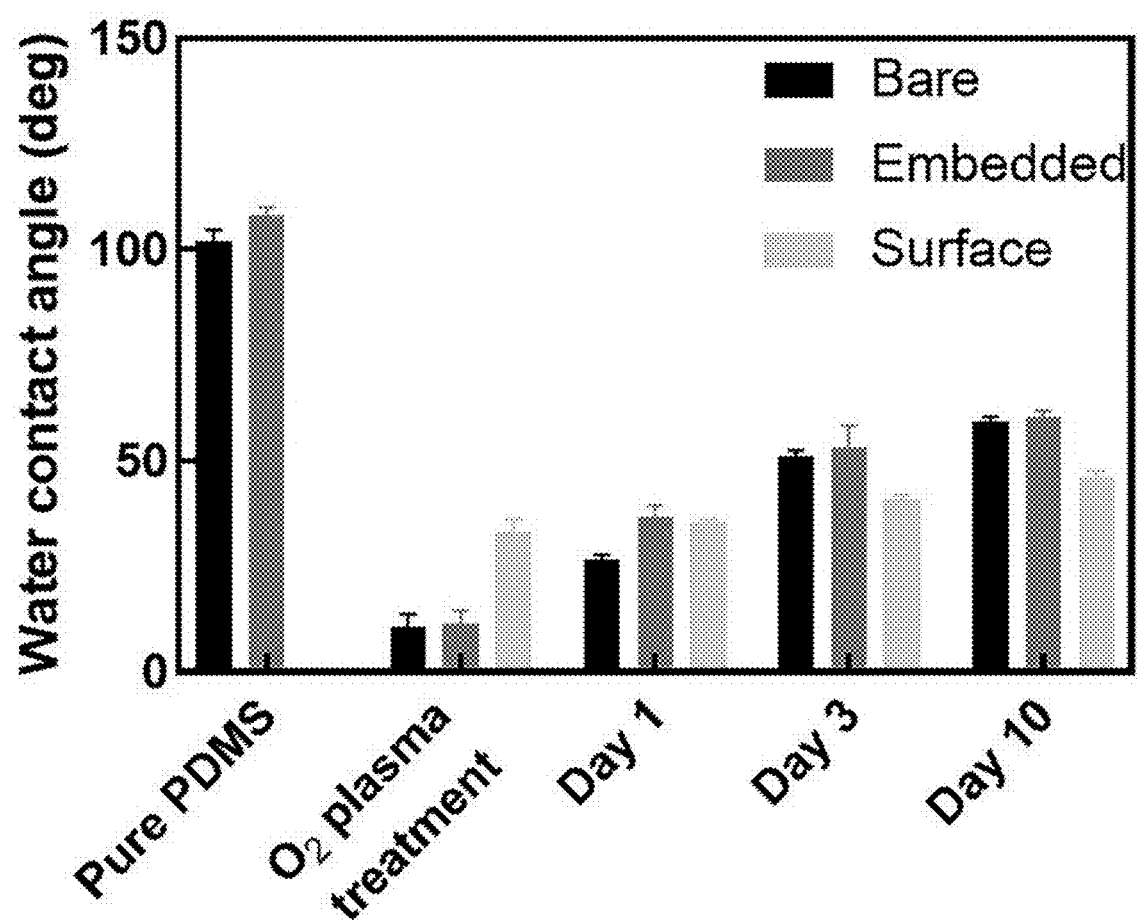
FIG. 6 shows the comparison results of water contact angles of respective bare PDMS, AgNW on PDMS, and AgNW-embedded PDMS substrates by O2 plasma treatment according to one experimental example of the present disclosure.

The water contact angles (θ) of the bare PDMS, AgNW on PDMS, and AgNW-embedded PDMS thin films by $O_2$ plasma treatment were measured, and the results are shown in FIG. 6 and Table 1.

TABLE 1

| Classification | Control | Immediately after treatment | After 1 day (24 h) | After 5 Days (60 h) | After 10 Days (120 h) |
|---|---|---|---|---|---|
| Bare PDMS | 102.00 | 10.67 | 26.53 | 50.89 | 59.46 |
| AgNW on PDS | 108.00 | 11.29 | 36.66 | 53.35 | 60.25 |
| AgNW-embedded PDMS | — | 33.18 | 35.05 | 40.74 | 46.12 |

As can be confirmed from FIG. 6 and Table 1, the water contact angle (8) of the bare PDMS was low, 10.67° immediately after $O_2$ plasma treatment and was 59.46° after 10 days, showing a great range of change. The water contact angle of the AgNW on PDMS was 11.29° immediately after O2 plasma treatment and was 60.25° after 10 days, showing a similar range of change to the water contact angle of the bare PDMS.

However, the water contact angle of the AgNW-embedded PDMS was 33.18° immediately after O2 plasma treatment and was 46.12° even after 10 days, and considering this, the AgNW-embedded PDMS can enhance cell adhesion since the wettability of the thin film was stabilized and the sample was maintained in a hydrophilic state for a long period of time.

1-4. Transparency Analysis

Figure 7:
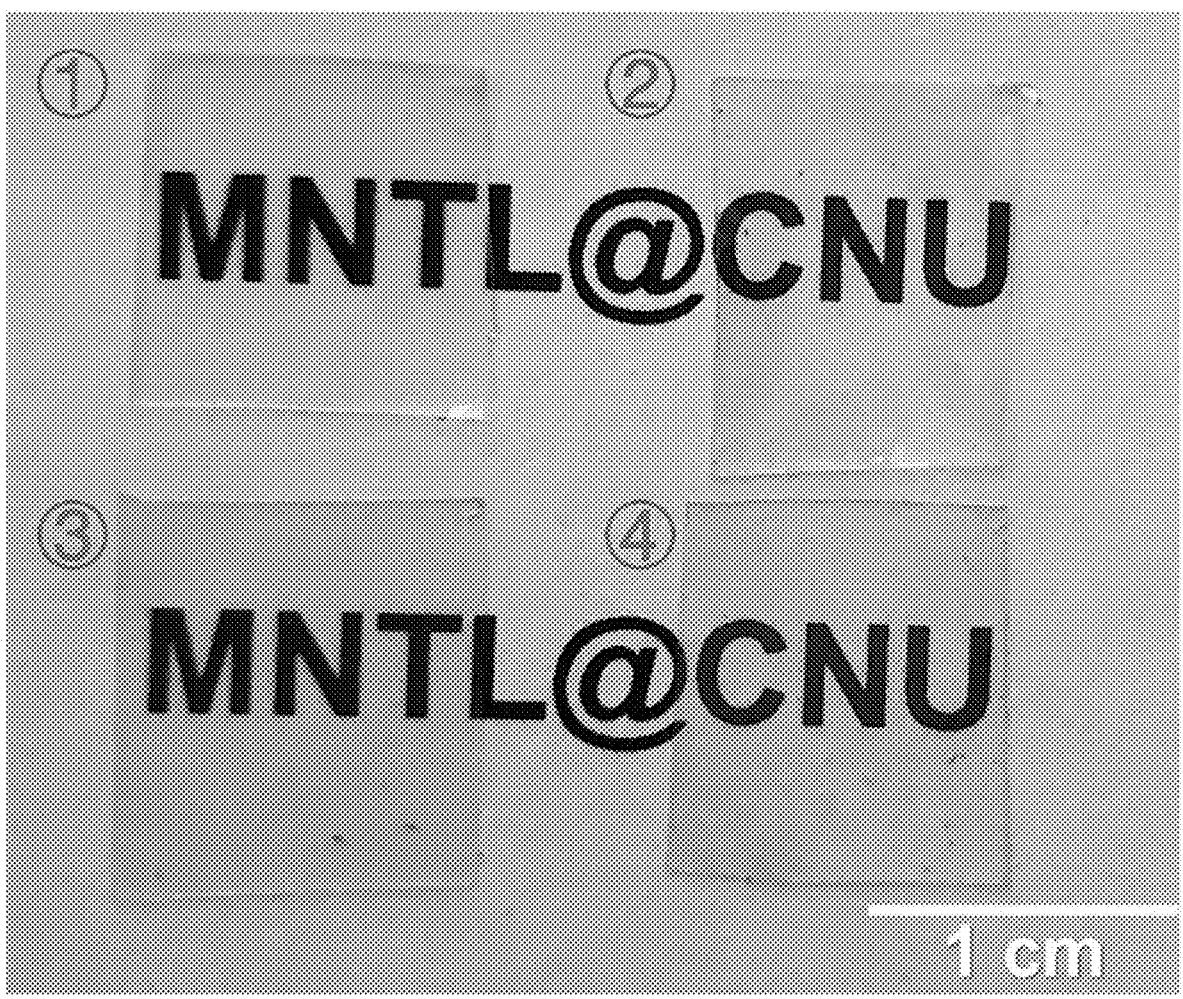
FIG. 7 shows the comparison results of transparency of PDMS thin films fabricated according to one preparative example of the present disclosure.

The comparison of transparency among the PDMS thin films is shown in FIG. 7. In FIG. 7, ① shows a bare PDMS thin film, ② shows A NW-embedded PDMS (silver nanowire spin coating, one time), ③ shows AgNW-embedded PDMS (silver nanowire spin coating, two times), and ④ shows AgNW-embedded PDMS (silver nanowire spin coating, three times).

As can be confirmed from FIG. 7, there was no significant difference in transparency among the thin films, and the transparency of each thin film was high such that the characters on the back of the thin film could be seen. In other words, when cells were cultured using the substrate, the cultured cells could be smoothly observed by an inverter microscope or the like since the substrate was not opaque even with high conductivity.

1-5. Peeling Test

Figure 8:
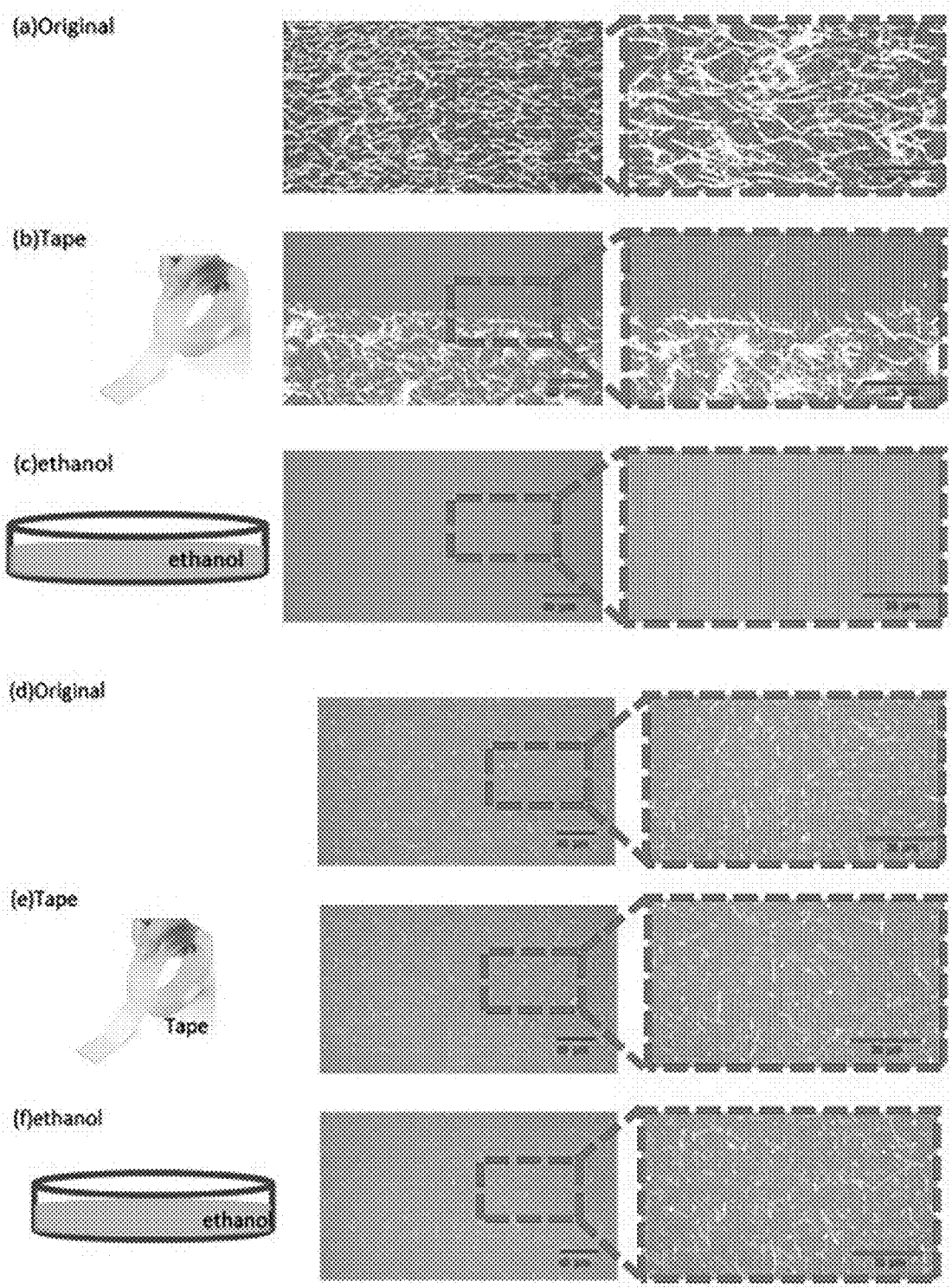
FIG. 8 shows the peeling test results of silver nanowires according to one experimental example of the present disclosure.

The peeling test of silver nanowires was performed using a tape and ethanol together with ultrasonication, and the results are shown in FIG. 8.

As can be seen from (a) to (c) of FIG. 8, the silver nanowires of the AgNW on PDMS were easily removed by the tape. However, as can be seen from (d) to (f) of FIG. 8, the silver nanowires of the AgNW-embedded PDMS were not easily removed by the tape. That is, as for the AgNW-embedded PDMS, most of the silver nanowires were impregnated into the polydimethylsiloxane layer and only a part of the silver nanowires were exposed from the polydimethylsiloxane layer, so that the silver nanowires have excellent ability to fix to the thin film and thus can be stability maintained for a long period of time.

Experimental Example 2: Cell Culture 2-1. Overview

The animal experiment was approved by the Animal Care Committee at the Chonnam National University of South Korea. Cardiomyocytes were isolated from the heart of rats aged 1-3 days. After the isolation of the heart, the tissue was cut into tiny pieces, followed by enzymatic degradation. After the cardiomyocytes and the fibroblast layer were separated by centrifugation using Percoll®, cardiomyocytes were obtained. The prepared cardiomyocytes were seeded at a density of 1,000 cell/mm2 in the top of thin films.

The culture medium was made from 67% of DMEM (Dulbecco's modified Eagle's medium, LONZA), 17% of M199 (heparin sodium salt from porcine intestinal mucosa, Sigma-Aldrich), 10% of horse serum (Sigma-Aldrich), 5% of FBS (supplemented with 5% fetal bovine serum, Sigma-Aldrich), and 1% of penicillin-streptomycin (Sigma-Aldrich), and the culture medium was replaced every three days.

Prior to the cell seeding, polydimethylsiloxane thin films were cut into small squares with a length of 1 cm to fit into 24-well culture plates, then the samples were washed with 70% ethanol three times, each time for 10 min, followed by sterilization with ultraviolet sterilizer. The thin films were treated with oxygen plasma ($O_2$ gas: 20 sccm, time: 1 sec, power: 100 w) and precoated fibronectin as extracellular matrix (ECM).

2-2. Cell Adhesion

A comparison of cell adhesion according to the number of times of silver nanowire spin coating is shown in FIG. 9A. Each polydimethylsiloxane substrate was not subjected to O2 plasma treatment.

As can be confirmed from FIG. 9A, as for the polydimethylsiloxane substrate not subjected to silver nanowire spin-coating, cells were detached from the surface of the substrate on the 7th day after cell culturing. As for the AgNW-embedded PDMS substrate subjected to not silver nanowire spin-coating one time, some cells were detached on the 8th day after cell culturing, and as for the AgNW-embedded PDMS substrate subjected to silver nanowire spin-coating two times or three times, cells were not detached on even the 9th day after cell culturing.

Figure 9B:
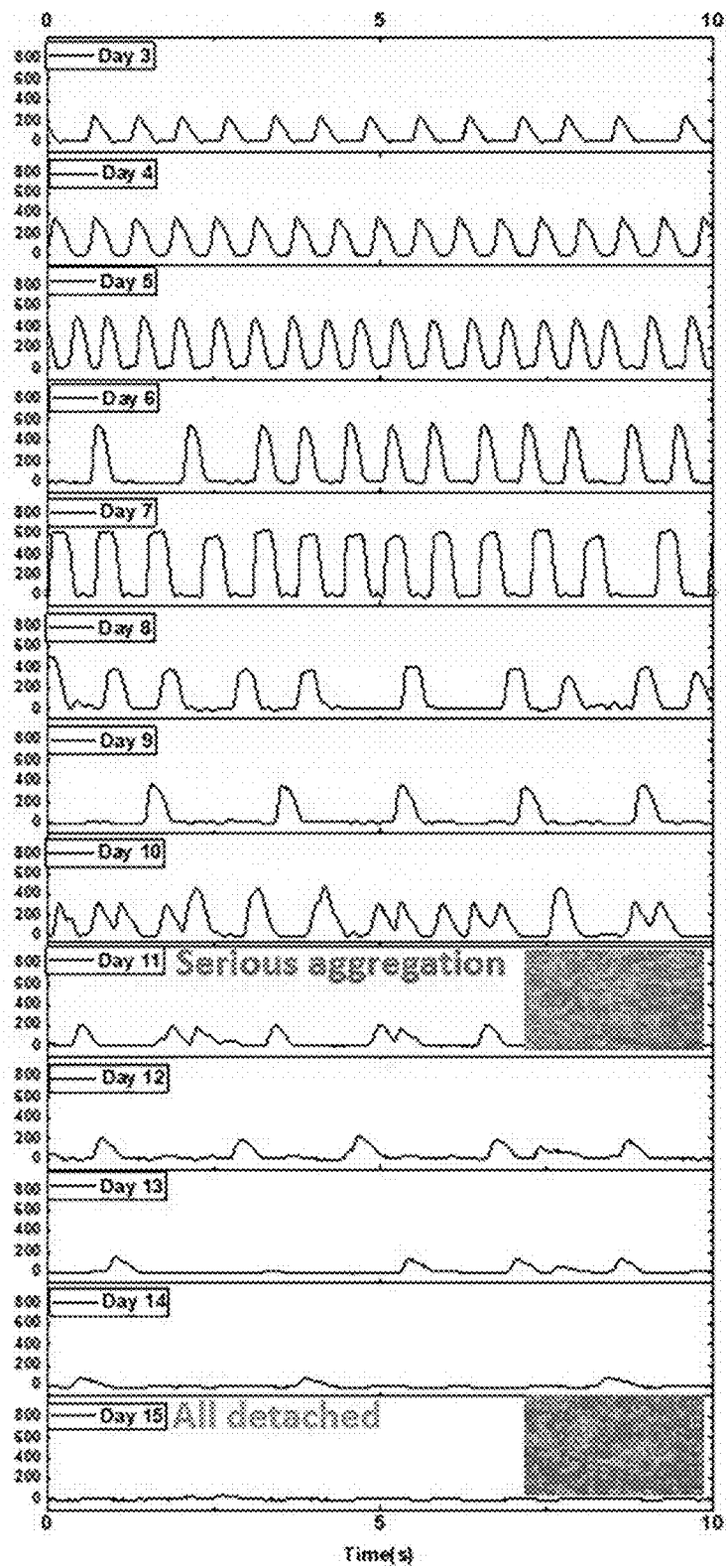
Figure 9C:
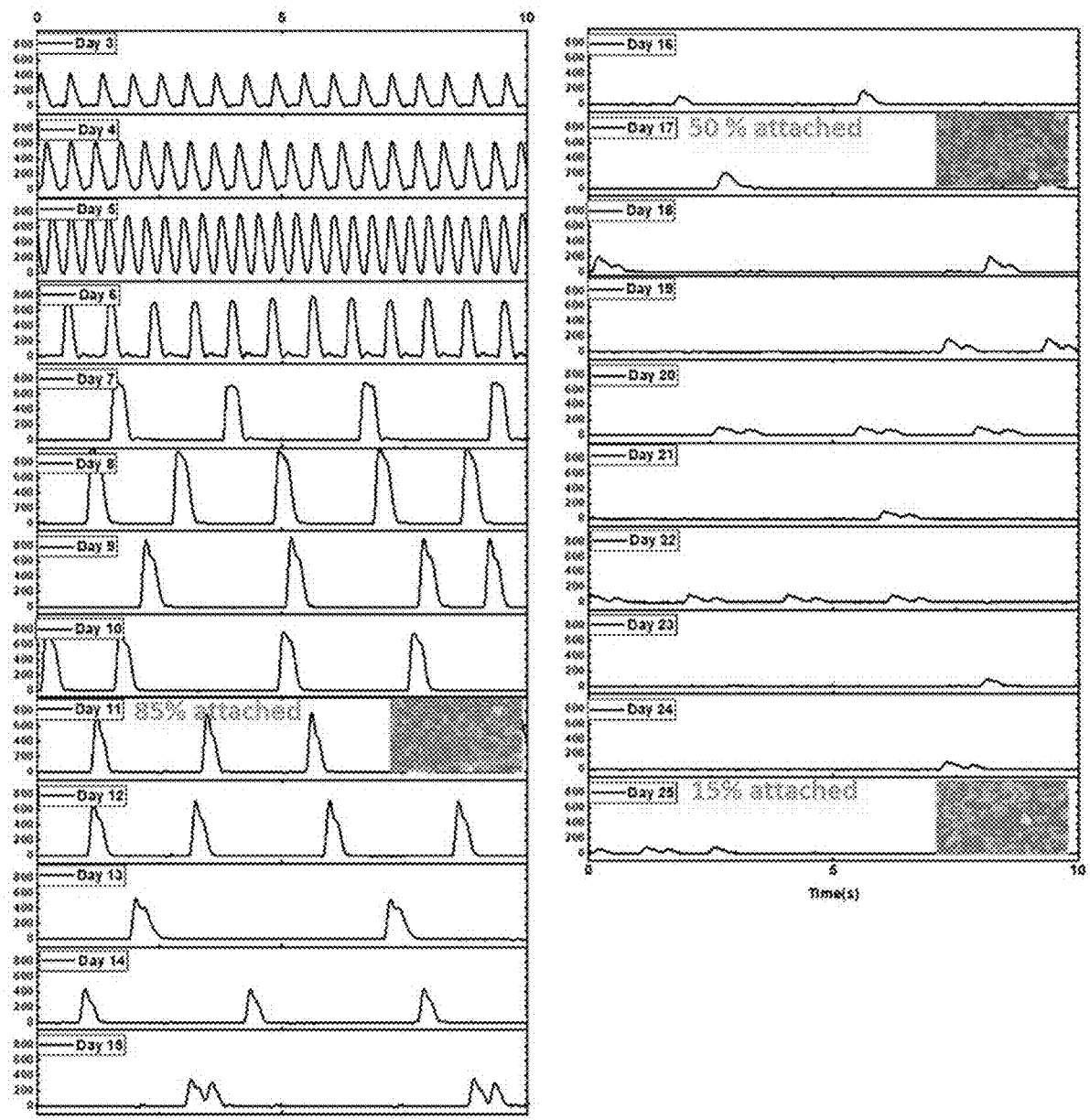

In addition, as can be confirmed from FIGS. 9B and 9C showing the long-term cell culturing experiment results, as for the bare PDMS, severe aggregation was started from the 11th day of culturing, and the complete detachment (displacement) of cardiomyocytes was observed on the 15th day of culturing. However, the cardiomyocytes cultured on the AgNW-embedded PDMS survived without detachment until the 25th day of culturing, and displacement was still detected by a laser vibrometer.

Figure 9D:
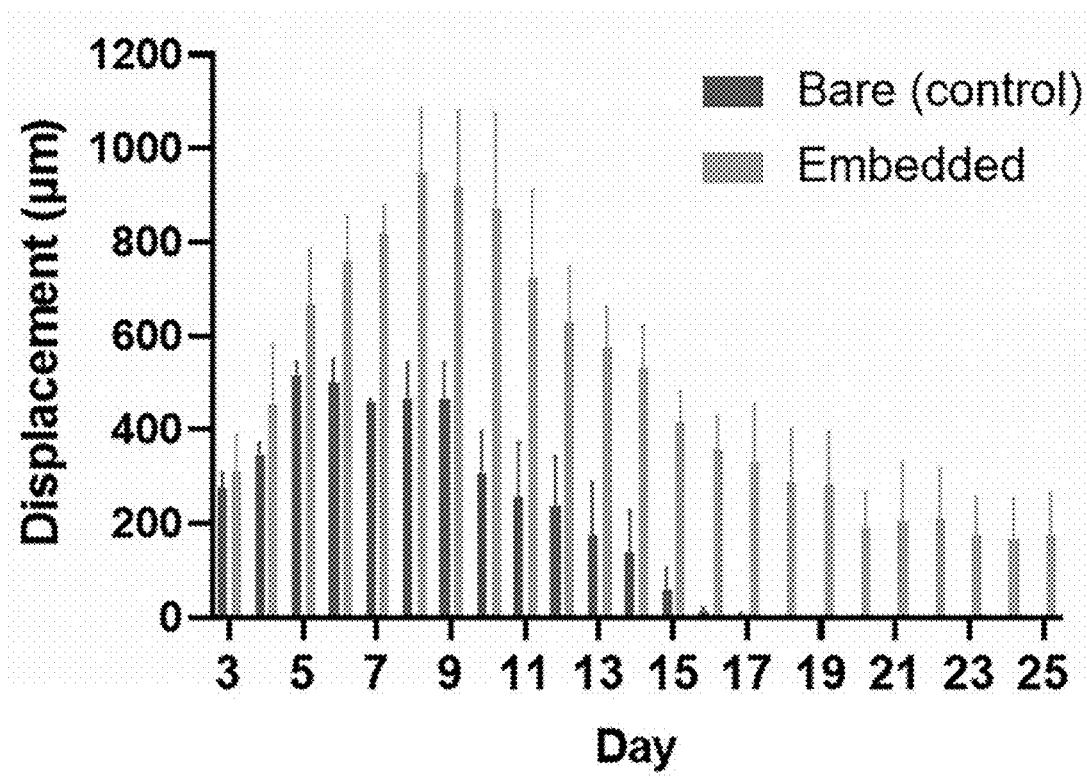

In addition, the AgNW-embedded PDMS showed a significant displacement difference from the bare PDMS. As for the bare PDMS, the displacement decreased to less than 400 from the 8th day of culturing, while as for the AgNW-embedded PDMS, the displacement decreased to less than 400 on the 15th day of culturing. The tendency of displacement changes in the samples subjected to repeated measurements three times are shown in FIG. 9D. It was observed that the displacement of the AgNW-embedded PDMS was significantly higher from the 6th day of culturing. The displacement of the control could not be measured on the 17th day, and the displacement of the AgNW-embedded PDMS could be observed on the 25th day after culturing.

Considering these results, the AgNW-embedded PDMS improved cell-to-cell communication due to nanowires, and thus can finally generate higher displacements, thereby facilitating the detection of cell beating.

That is, the AgNW-embedded PDMS substrate subjected to spin-coating two times or more showed excellent cell adhesion of cardiomyocytes even without a separate process for $O_2$ plasma treatment as well as significantly increased contraction force.

2-3. Cell Growth Guidance

Figure 10:
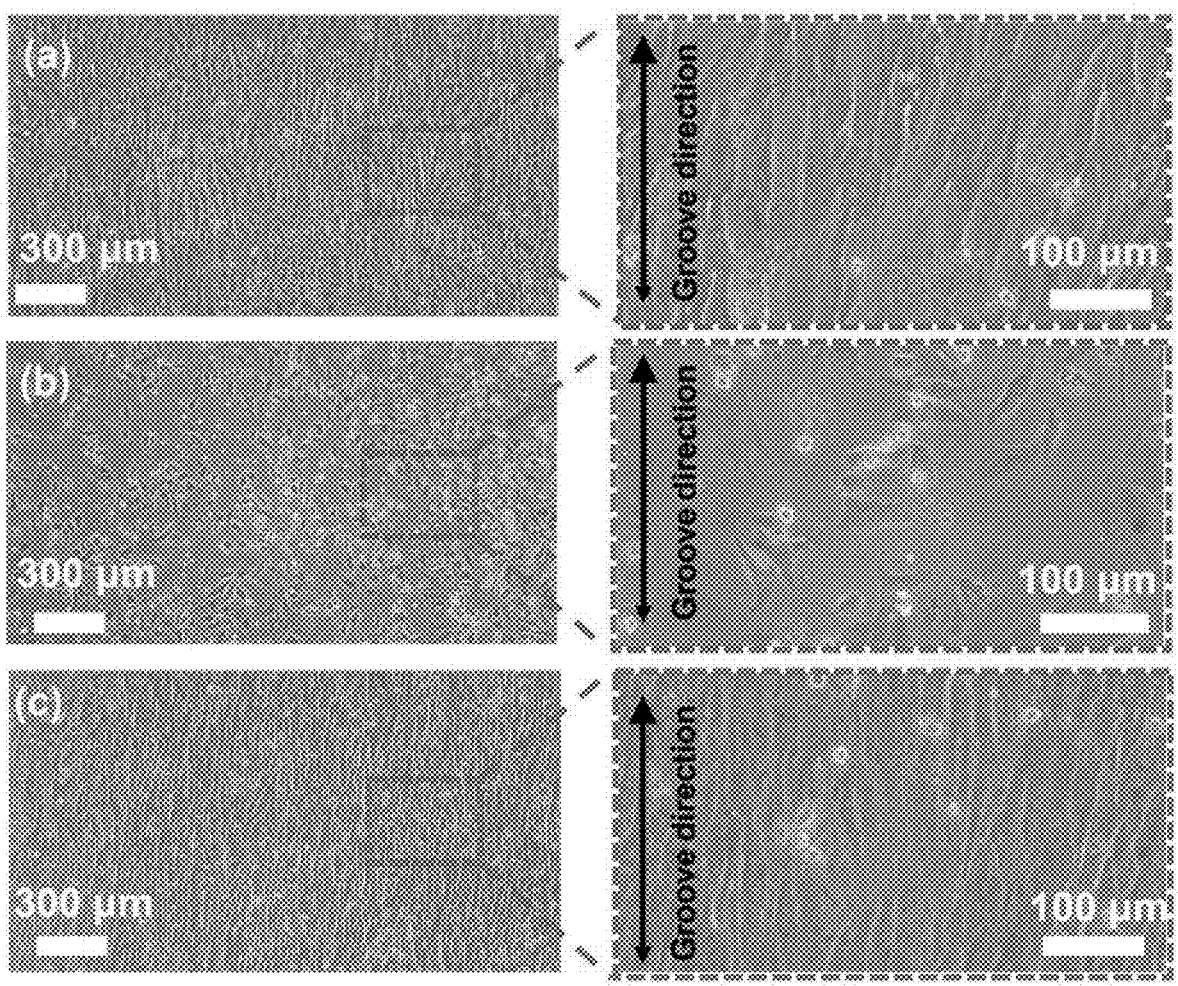
FIG. 10 shows optical images of neonatal rat ventricular myocyte distributions in the bare PDMS, AgNW on PDMS, and AgNW-embedded PDMS substrates according to one example of the present disclosure.

Neonatal rat ventricular myocytes (NRVM) were cultured on the three different thin films, and the observation was started on the 3th day of cell culture. The optical images of the neonatal rat ventricular myocyte distributions on bare PDMS, AgNW on PDMS, and AgNW-embedded PDMS were recorded, and the results are shown in FIG. 10. FIG. 10 shows the neonatal rat ventricular myocyte distribution on bare PDMS (a), AgNW on PDMS (b), and AgNW-embedded PDMS while all the substrates were subjected to O2 plasma treatment.

As can be confirmed from FIG. 10, the AgNW on PDMS (b) was observed to show lower cell adhesion compared with the bare PDMS (a). The reason was that cell alignment was very poor due to the toxicity of AgNWs; even bare PDMS enhanced cell adhesion due to O2 plasma treatment; and the silver nanowires of AgNW on PDMS were detached from the substrate surface over time.

On the contrast, AgNW-embedded PDMS showed much higher cell adhesion and high cell alignment. In addition, the silver nanowires of the AgNW-embedded PDMS were embedded in the polydimethylsiloxane layer, and thus the silver nanowires were not detached even over time, thereby maintaining cell adhesion. This indicates that a substrate having cells that can be well aligned and maintained in an attached state can better mimic the in-vivo environment than a substrate having no such cells.

It was also observed that the silver nanowires affected cell alignment and the viability of cardiomyocytes was dropped, considering (a) of FIG. 10. This indicates that the embedded structure was effective in reducing the toxicity of silver nanowires.

Experimental Example 3: Immunocytochemical Staining 3-1. Overview

Immunocytochemical staining (ICC) was performed by using following antibodies. In the typical process, the cardiomyocytes were placed in the 3.7% formaldehyde dissolved PBS solution for 20 min at room temperature and washed three times with Dulbecco's phosphate-buffered saline (DPBS). Then, cardiomyocyte permeabilization was completed with 0.1% Triton X-100 (Sigma-Aldrich) in DPBS for 5 min and blocked for 30 min in 3% bovine serum albumin (BSA, Sigma-Aldrich).

The primary antibodies, such as a mouse monoclonal anti-troponin, anti-connexin 43, Sigma-Aldrich) and α-sarcomere actinin (Abcam), were diluted to 1:100 with 1% BSA solution and incubated for 90 min at room temperature. The secondary antibodies (Alexaflour 488 goat anti-mouse IgG conjugate, Alexaflour 568 goat anti-rabbit IgG+ (H+L) conjugates) were diluted to 1:200 in the same blocking solution and incubated for 90 min at room temperature. Lastly, the collected samples were mounted on coverslips using ProLong Gold Antifade (Sigma-Aldrich). After staining, the cardiomyocytes were analyzed through inverted confocal laser scanning microscopy (Leica TCS SP5 XCLSM, Germany).

3-2. Results

To investigate the different cell characteristics of bare PDMS, AgNW on PDMS, and AgNW-embedded PDMS, immunocytochemical staining (ICC) was performed. For the comparison of the protein expressions of the cardiomyocytes cultured on different thin films for 8 days or more, the results of staining with the cardiac-specific markers α-actinin (green) and connexin 43 (Cx43-red) are shown in FIG. 11.

Figure 11:
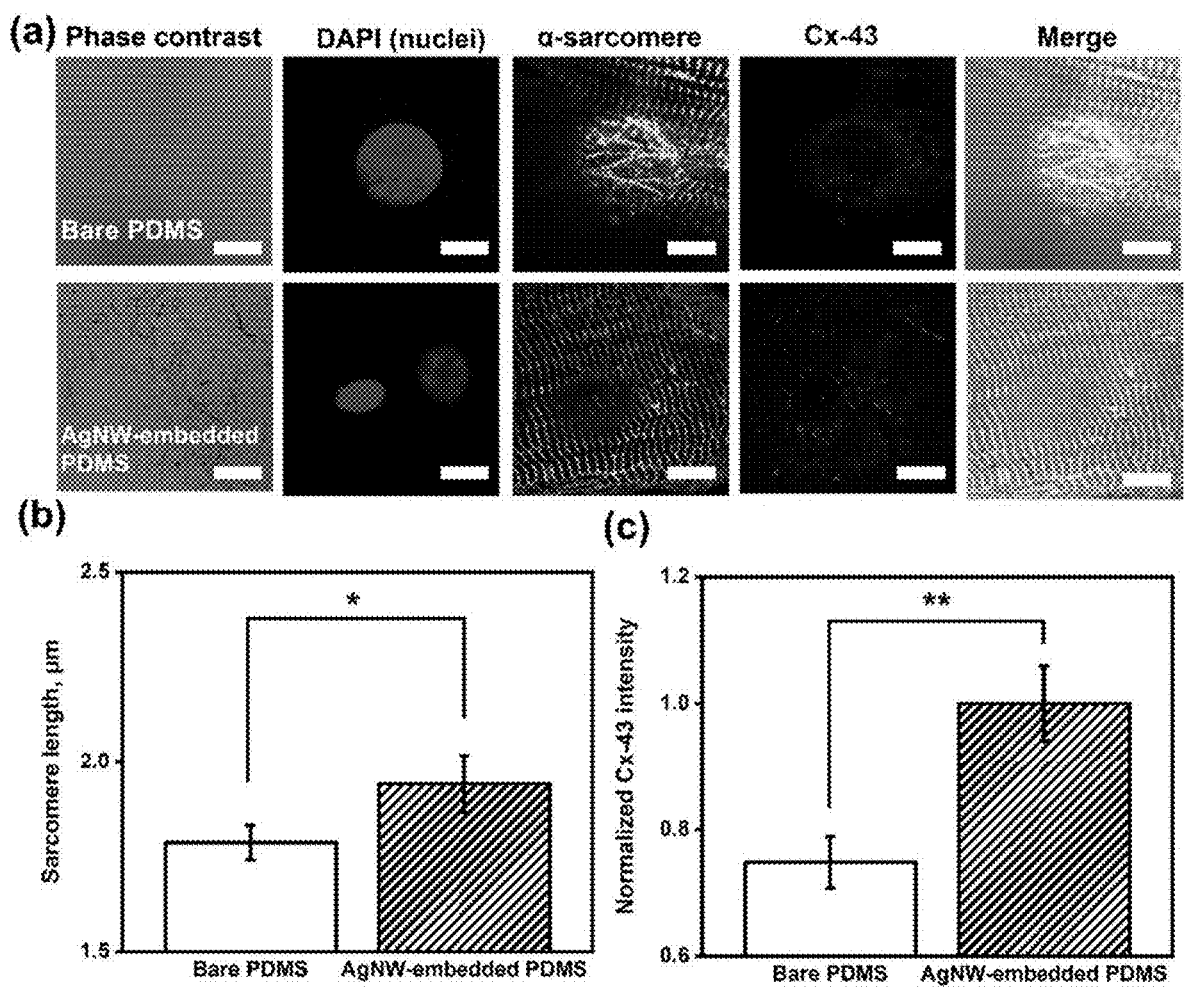
FIG. 11 shows images of the results of staining cardiac-specific markers including α-actinin (green) and connexin 43 (red) for the protein expression comparison of cardiomyocytes cultured on different thin films for 8 days or more according to one experimental example of the present disclosure.

As can be confirmed from FIG. 11, AgNW-embedded PMDS showed more organized myofilaments and much more homogeneous distribution of Cx43 localized around the cell periphery. In such a case, α-actinin is a part of the actin-myosin contraction complex, and Cx43 is a gap junction protein involved in synchronous contraction. It was confirmed that AgNW-embedded PDMS could significantly increase α-sarcomere length and Cx43 protein expression.

Experimental Example 4: Protein Detection Through Western Blot

Figure 12:
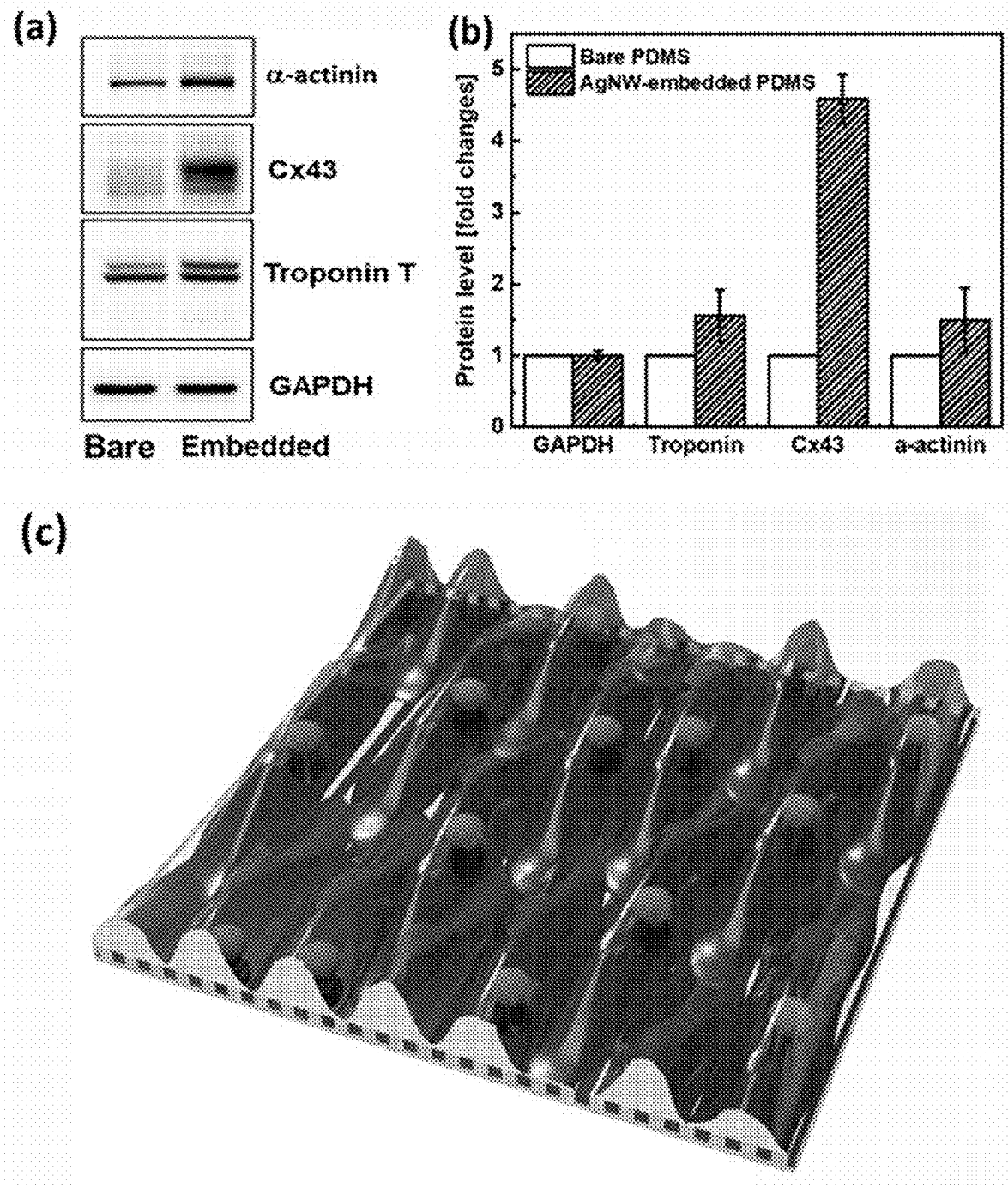
FIG. 12 shows the comparison of protein expression of cardiomyocytes cultured on bare PDMS and AgNW-embedded PDMS according to one experimental example of the present disclosure.

The protein expression levels of cardiomyocytes cultured on bare PDMS or AgNW-embedded PDMS substrates were measured and are shown in FIG. 12 and Table 2.

TABLE 2

| Protein level (fold changes) | GAPDH | Troponin T | C × 43 | α-actinin |
|---|---|---|---|---|
| Bare PDMS | 1 | 1 | 1 | 1 |
| AgNW-embedded PDMS | 1.00885 | 1.56401 | 4.58754 | 1.49901 |

As can be confirmed from FIG. 12 and Table 2, the cardiomyocytes cultured on the bare PDMS substrate showed differences in expression levels of Troponin T, Cx43, and α-actinin proteins, from the cardiomyocytes cultured on AgNW-embedded PDMS. For reference, (c) of FIG. 12 shows that cardiomyocytes were aligned and grown in one direction on the cantilever having nanogrooves, wherein the oval figures located on respective pitches correspond to cardiomyocytes.

As for the protein expression levels of the control GAPDH in the cardiomyocytes cultured on AgNW-embedded PDMS compared with bare PDMS, the control GAPDH expression was increased by 1.009-fold, no significant difference. The troponin T expression was improved by about 1.564-fold, the Cx43 expression by about 4.588-fold, and the α-actinin expression by about 1.499-fold. Considering these results, it is determined that the polydimethylsiloxane substrate having silver nanowires embedded in nanopatterns can maximize the intercellular connectivity and the growth of sarcomeres.

Experimental Example 5: Video Analysis 5-1. Overview

The high-quality video was recorded through an inverter microscope, and then video analysis was performed using 'tracker' software. The beat rate, contraction force, and synchronization were statistically analyzed. All recording process were performed at 37° C. with 5% $CO_2$.

5-2. Cell Viability

The live/dead viability test was performed on bare PDMS, AgNW on PDMS, and AgNW-embedded PDMS. After the cardiomyocytes were cultured for 48 h, the cell viability results are shown in FIG. 13 and Table 3.

TABLE 3

|  | Bare PDMS(Control) | AgNW on PDMS | AgNW-embedded in PDMS |
| --- | --- | --- | --- |
| Live/Dead ratio (Normalized to control) | 1.0 | 0.92 | 0.98 |

Figure 13:
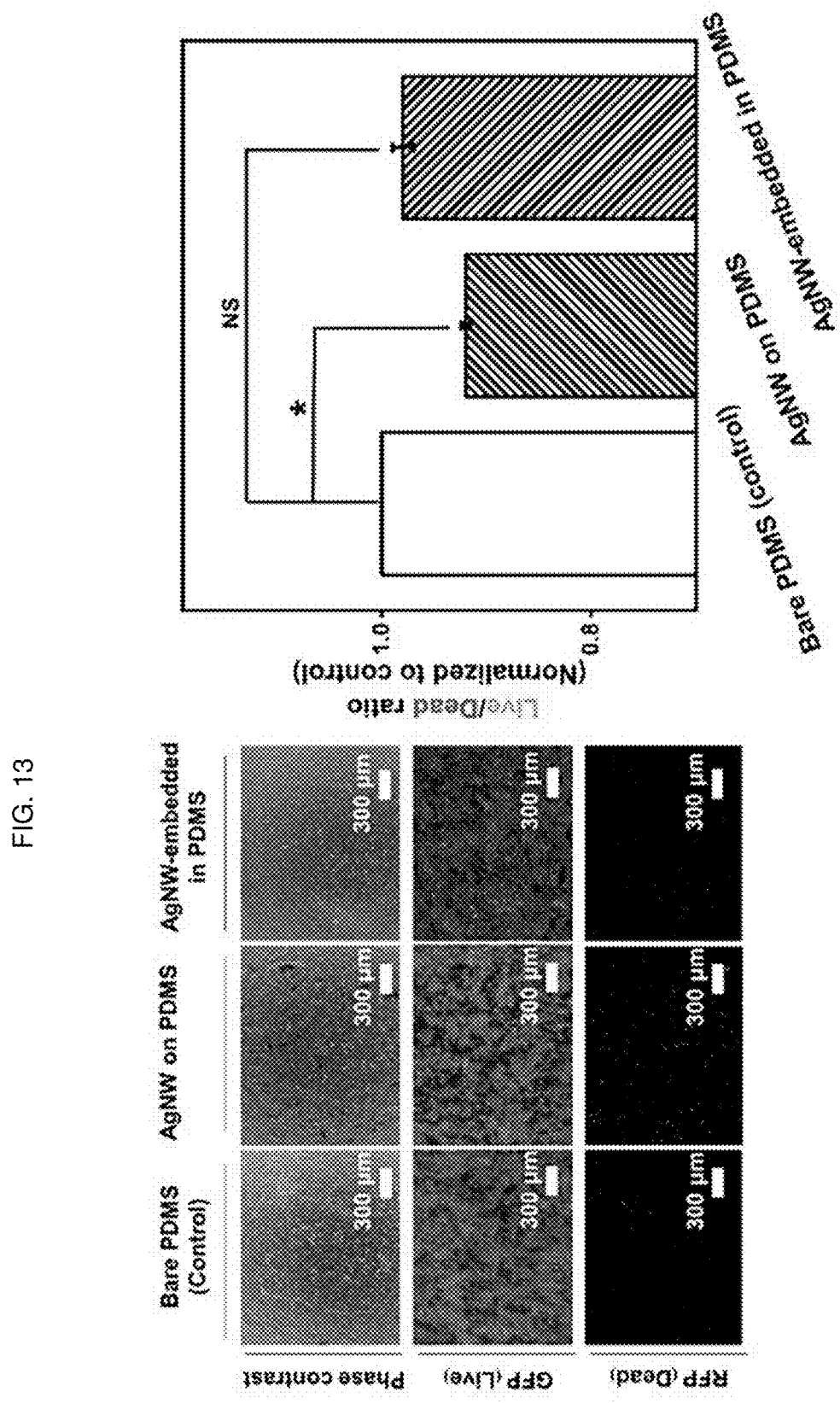
FIG. 13 shows the test results of live/dead viability on bare PDMS, AgNW on PDMS, and AgNW-embedded PDMS according to one example of the present disclosure.

As can be confirmed from FIG. 13 and Table 3, the cell viability was observed to be high in all of the bare PDMS, AgNW on PDMS, and AgNW-embedded PDMS samples through fluorescent live/dead staining (green/red), and there were few dead cells after a predetermined culture period.

The cell viability on the AgNW-embedded PDMS showed no significant difference from that on the bare PDMS, but the cell viability on the AgNW on PDMS showed a significant difference from that on the bare PDMS, and thus it can be seen that the cell viability was somewhat different depending on the presence or absence of silver nanowires on the surface. It can also be seen that silver nanowires affected cell alignment.

5-3. Video Analysis

Figure 14:
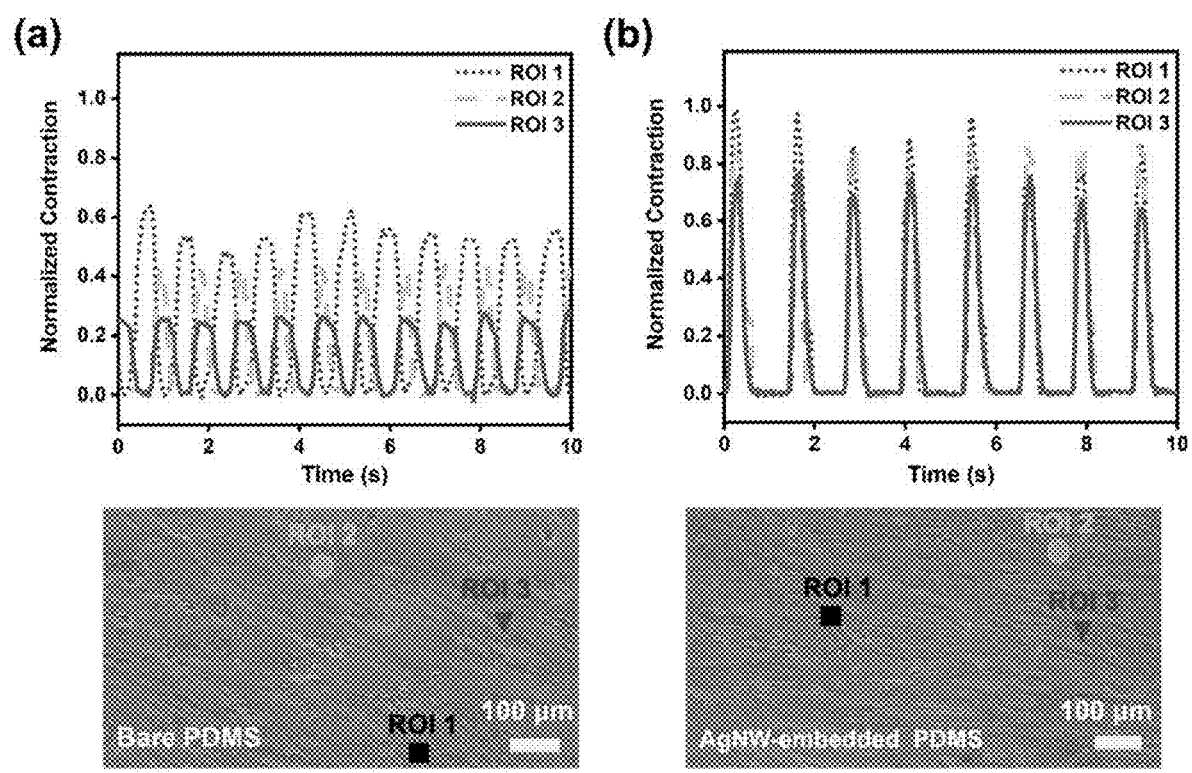
FIG. 14 shows the analysis results of cell contraction on three independent regions of interest (ROI 1, ROI 2, and ROI 3) in bare PDMS and AgNW-embedded PDMS by using a video analysis software according to one experimental example of the present disclosure.

The analysis results of cell characteristics were obtained from three independent regions of interest (ROI 1, ROI 2, and ROI 3) on bare PDMS and AgNW-embedded PDMS, by using a video analysis software, and the results are shown in FIG. 14.

As can be confirmed from FIG. 14, in the three different regions of interest (ROIs), the intercellular synchronization and contraction force were irregular for bare PDMS thin films, while the regular beat behavior was shown for AgNW-embedded PDMS.

As can be confirmed from (a) of FIG. 14, the cells cultured on bare PDMS showed a low contraction force of a level of 0.6 at ROI 1, a level of 0.4 at ROI 2, and a level of 0.2 at ROI 3, with irregular beat cycles among the regions of interest, while the cells cultured on AgNW-embedded PDMS showed a high contraction force of a level of 1.0 at ROI 1, a level of 0.8 at ROI 2, and a level of 0.7 at ROI 3, with regular beat cycles among the regions of interest.

That is, the cell beat behavior was highly synchronized in the cells on AgNW-embedded PDMS.

Figure 15:
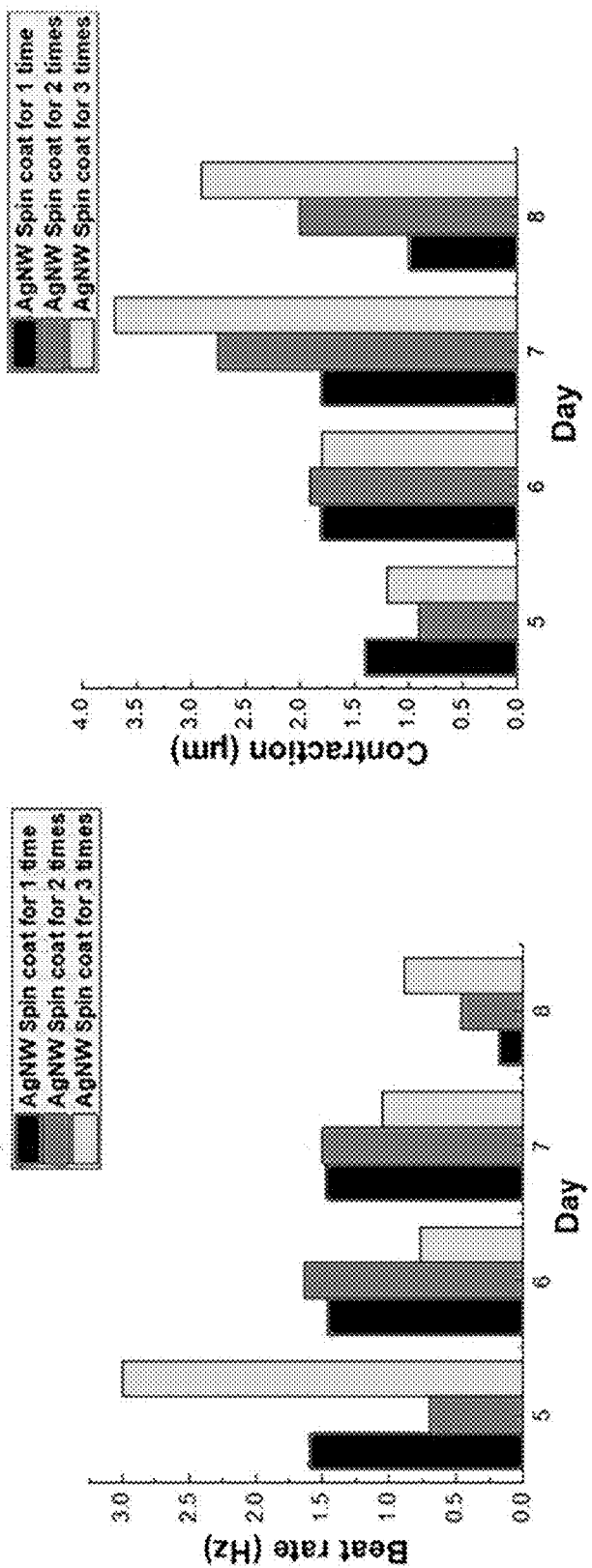
FIG. 15 shows graphs illustrating the results of tracking single cell beating according to one experimental example of the present disclosure.

The results of tracking single cell beating by using the software "Tracker" are shown in FIG. 15.

As can be confirmed from FIG. 15, as the cells grew, the beat rate decreased but the contraction increased. As the number of times of spin coating of silver nanowires increased, the cell adhesion for promoting cell development and maturation also increased. To further investigate the behavior of different thin films, cantilevers were fabricated using bare PDMS, AgNW on PDMS, and AgNW-embedded PDMS. The beat rate, displacement, and drug tests could be performed by applying a laser vibrometer.

Experimental Example 6: Calcium Transient

To evaluate the effect of the conductive substrate, calcium (Ca2+) transients were examined for cardiomyocytes cultured on each of bare and embedded substrates. The Ca2+-sensitive dye Fluo-4 AM was used for treating cardiomyocytes cultured on the surface during 40 min of incubation, and the Ca2+ fluorescence dye was detected by an argon laser at 488 nm under a confocal microscope. Before recording a video of Ca2+ transition, the samples were kept in a stage-top incubator for 20 min. The calcium transient cultured on the bare and embedded substrates are shown in FIG. 16.

Figure 16:
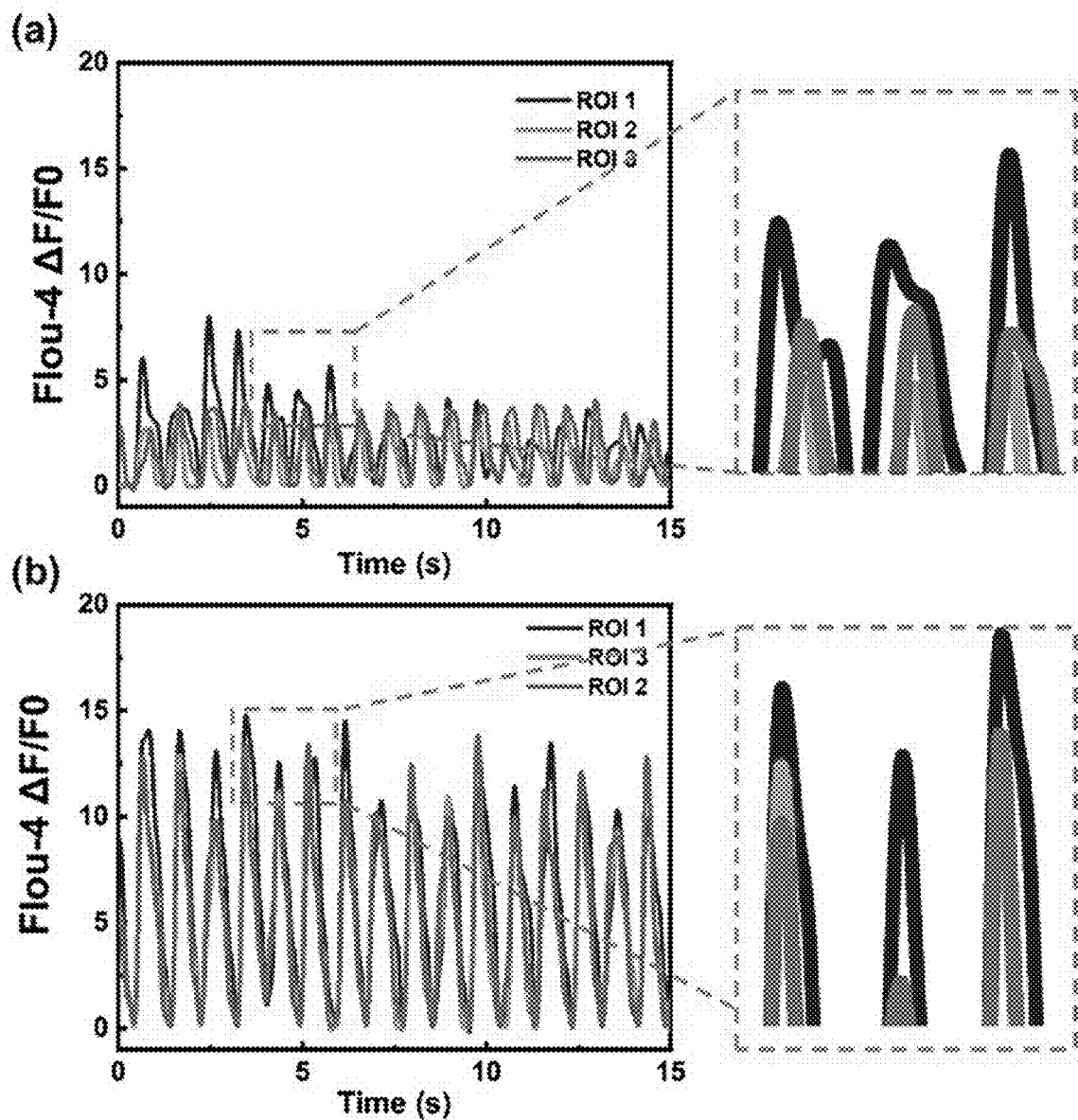
FIG. 16 shows graphs illustrating calcium transients of cardiomyocytes cultured on (a) bare and (b) embedded substrates.

As can be confirmed from FIG. 16, there was differences in intracellular calcium intensity and synchronized calcium spike between the bare and embedded substrates. The strength, rate, and rhythm of cardiomyocyte contraction and relaxation are strictly controlled by electric stimulation and vibration of cytoplasmic Ca2+ concentration. Electrical signals take the form of action potentials determined by cardiac ion channels. Three different independent regions of interest (ROIs) were selected and further analyzed for synchronism, and contraction curves were obtained by measuring the strength change due to cell contraction for each region.

As a result, the spontaneous Ca2+ transients in neighboring cells were asynchronous on the bare substrate. In contrast, the spontaneous Ca2+ transients were accurately synchronous among the three independent ROIs for the cardiomyocytes on the embedded substrate. Immature cardiomyocytes were electrophysiologically different from mature cardiomyocytes. It can be therefore seen that the embedded substrates can not only provide a sufficient microenvironment for cell adhesion and maturation, but also increase electrical cell-cell coupling for Ca2+ transients activated by synchronous beating and optimal cell-cell interactions. Experimental Example 7: Drug screening for investigating durability of cardiomyocytes To quantitatively analyze the correlation between cell maturation and drug toxicity, polymer cantilever arrays composed of the bare thin film and the embedded thin film were fabricated. To investigate the difference in drug toxicity according to the difference in cardiomyocyte maturity, the results of treating cardiomyocytes with three drugs having a cardiotoxic effect are shown in FIG. 17. Specifically, FIG. 17A shows the results of treatment with the actin-myosin inhibitor blebbistatin, FIG. 17B shows the results of treatment with the L-type calcium channel inhibitor verapamil, and FIG. 17C shows the results of treatment with the hERG channel blocker E-4031.

Figure 17A:
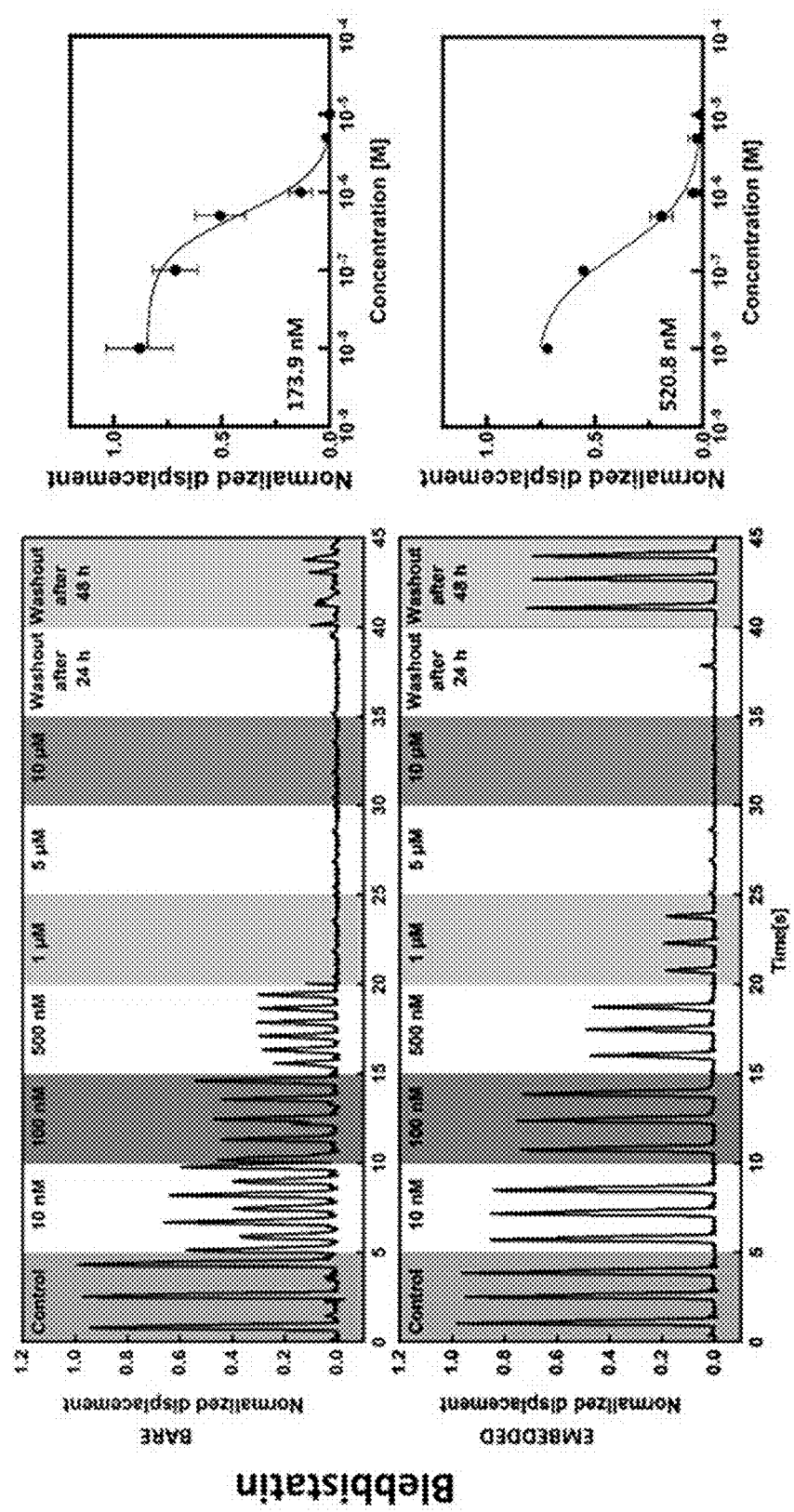
FIG. 17A shows graphs obtained by observing beat displacement changes of cardiomyocytes treated with blebbistatin having a cardiotoxic effect.
Figure 17B:
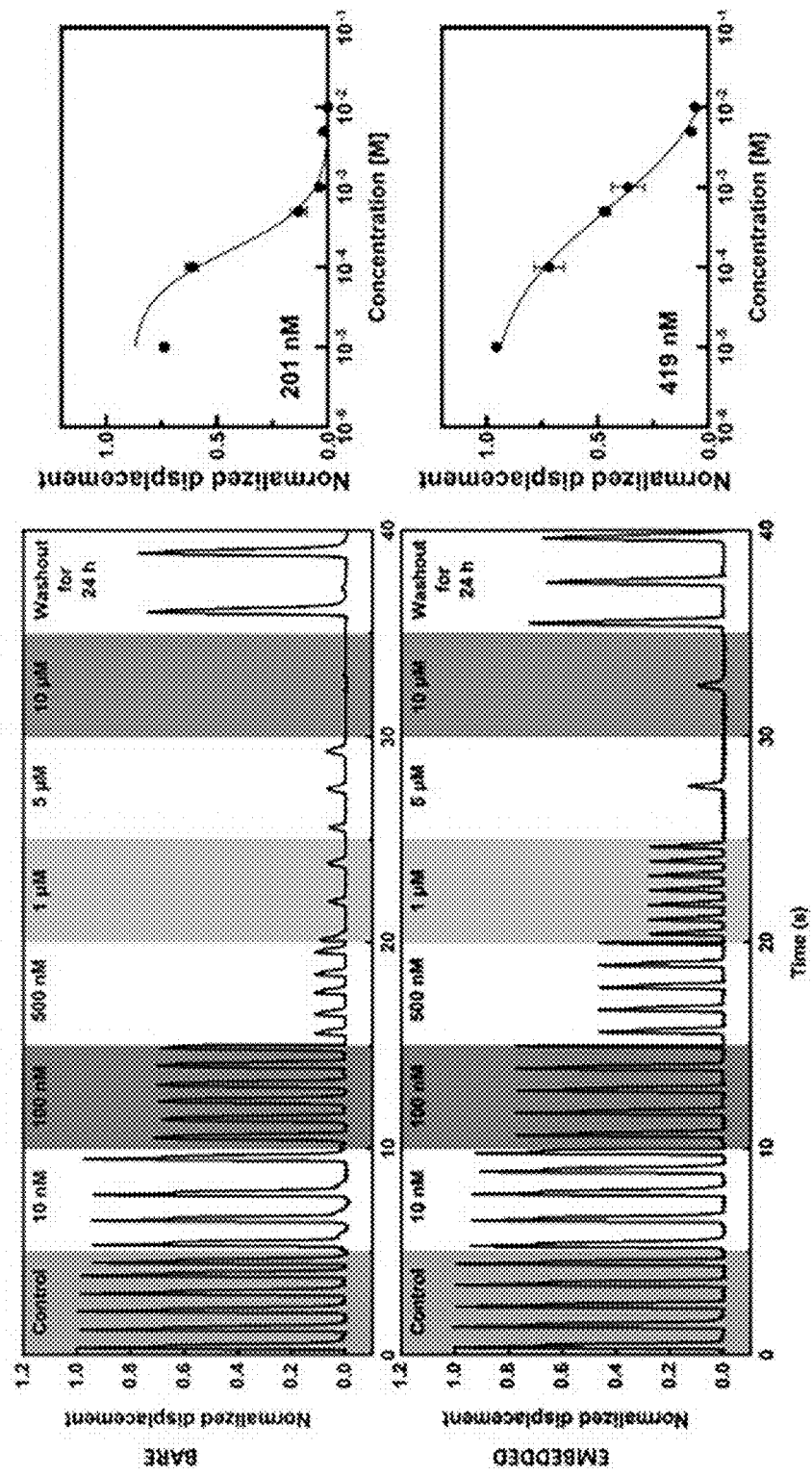
FIG. 17B shows graphs obtained by observing beat displacement changes of cardiomyocytes treated with verapamil having a cardiotoxic effect.
Figure 17C:
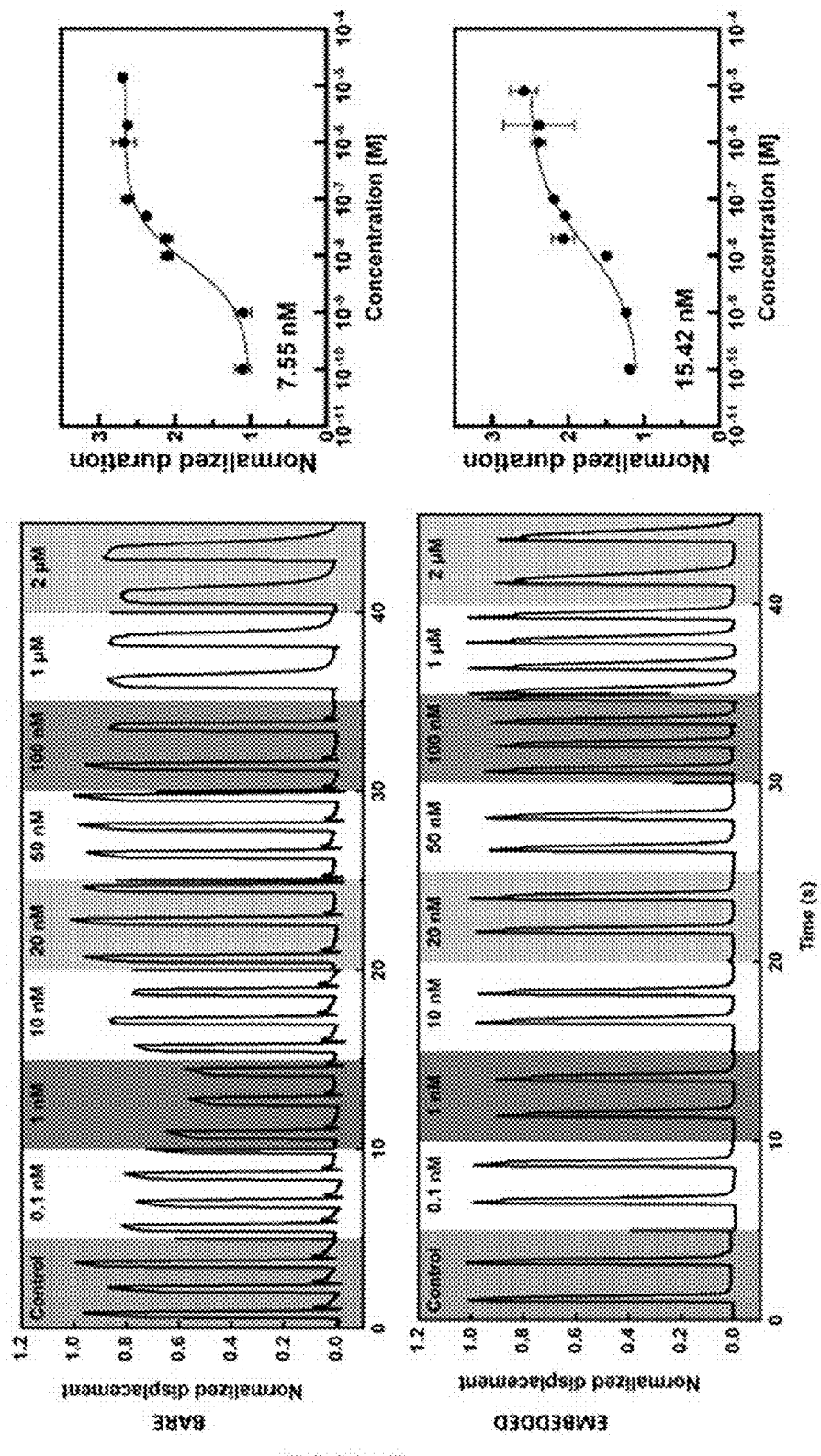
FIG. 17C shows graphs obtained by observing beat displacement changes of cardiomyocytes treated with E-4031 having a cardiotoxic effect.

As can be confirmed from FIG. 17A to 17C, mature cells had high resistance to drugs.

As can be confirmed from FIG. 17A, by the treatment with 10 nM blebbistatin, the bare PDMS cantilever already showed a half displacement reduction, but the embedded PDMS cantilever showed a displacement reduction of about 10%. By the treatment with 1 μm blebbistatin, the cardiomyocytes cultured on the bare PDMS no longer beat, but the cardiomyocytes cultured on the embedded PDMS still maintained a beat rate at a level of 20% compared with the maximum displacement value. It can be seen from the experimental results that the cardiomyocytes cultured on the embedded PDMS were relatively stronger to cardiotoxicity even with the addition of blebbistatin at 500 nM or higher to the culture. The media treated with drugs was replaced, and after 24 h, the beating characteristics of cardiomyocytes were again measured. The contraction returned to a level of 75% or more compared with before drug treatment for the embedded PDMS cantilever, but returned to only a level of 10% for the bare PDMS cantilever, with the beating frequency being very irregular. The IC50 values of cardiomyocytes cultured on each were about 174 nM (173.9 nM) for the bare PDMS thin film and about 520 nM (520.8 nM) for the embedded PDMS thin film. These results indicate that immature cells showed a relatively low IC50 value compared with mature cardiomyocytes on the embedded substrate.

As can be confirmed from FIGS. 17B and 17C, in the drug tests using verapamil and E-4031, the cardiomyocytes cultured on the embedded PDMS showed enhanced resistance to the other drugs, similar to blebbistatin, and considering these results, it can be seen that cardiomyocytes were more mature on the embedded cantilever.

In FIG. 17B, blebbistatin can stop spontaneous contraction of cardiomyocytes by directly suppressing the contraction of cardiomyocytes. In the control bare PDMS when treated with different doses of blebbistatin, the cell contraction force decreased as the drug concentration increased, and especially, the beat behavior of cardiomyocytes was not returned to the initial state even after washing for 48 h. Instead, the cardiomyocytes cultured on AgNW-embedded PDMS substrate showed high drug resistance, and the decreased contraction force returned to a level of 75% after washing for 48 h.

In FIG. 17C, E-4031 is a hERG channel blocker that prolongs the resting phase of an action potential. In bare PDMS as a control, the treatment with some doses of E-4031 showed a decrease in contraction force, and the beating cycle was irregularly changed as the drug dose increased. However, the cardiomyocytes cultured on AgNW-embedded PDMS had little change in the beating cycle, and the magnitude of contraction force was not significantly affected.

These results indicate that the silver nanowire-embedded PDMS substrate according to the present disclosure can improve the maturity of cells and the maturity of cells can further enhance drug resistance.

Experimental Example 8: RT-qPCR for Verifying Drug Durability Improvement

The responses of cardiomyocytes to the three different drugs concluded that the silver nanowire network embedded in the nanopatterns significantly improved cell maturation, and this was also confirmed by Western blotting. Specifically, RT-qPCR was conducted to further investigate the reason why the drug durability of cardiomyocytes cultured on the embedded PDMS was stronger, and the results are shown in FIG. 18 and Table 4.

TABLE 4

|  |  | Troponin | Cx43 | α-actinin | NCXX | MYH6 |
|---|---|---|---|---|---|---|
| Gene expression level [fold changes] | Bare | 1 | 1 | 1 | 1 | 1 |
|  | Embedded | 1.70074 | 1.50635 | 1.74355 | 1.3331 | 1.2998 |

Figure 18:
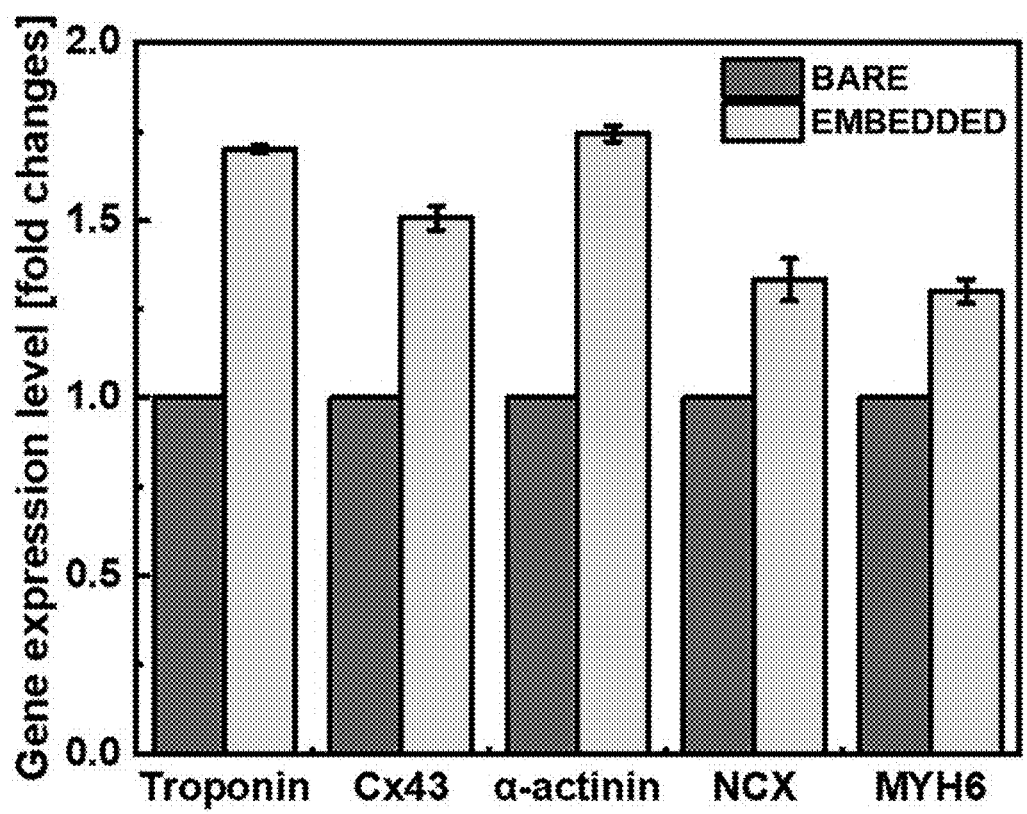
FIG. 18 shows a graph obtained by measuring gene expression levels of cardiomyocytes to verify the drug durability improvement by cardiomyocytes.

As can be confirmed from FIG. 18 and Table 4, troponin T and α-actinin were related with contractility, and Cx43 and NCX were responsible for intercellular communication and calcium treatment, respectively, and MYH6 represents the maturation of myofibrils. Compared with the bare PDMS, the embedded PDMS showed a 1.70-fold improvement in the troponin T expression level, a 1.51-fold improvement in the Cx43 expression level, a 1.74-fold improvement in the α-actinin expression level, a 1.33-fold improvement in the NCX expression level, and a 1.30-fold improvement in the MYH6 expression level.

In summary, the embedded PDMS substrate not only significantly increased cell maturation but also formed better cardiac tissue, and thus was thought to be more accurate than drug toxicity screening using single cells.

Experimental Example 9: Culturing of Human-Induced Pluripotent Stem Cell-Cardiomyocytes Since pre-clinical studies on rats could not completely predict effects on the human heart, human-induced pluripotent stem cell-cardiomyocytes (hiPSC-CMs) had significant advantages over the use of animal models. To further investigate the responses of different drugs on immature and mature cardiomyocytes in human cells, hiPSC-CMs were cultured. The drug screening results therefor are shown in FIG. 19.

Figure 19:
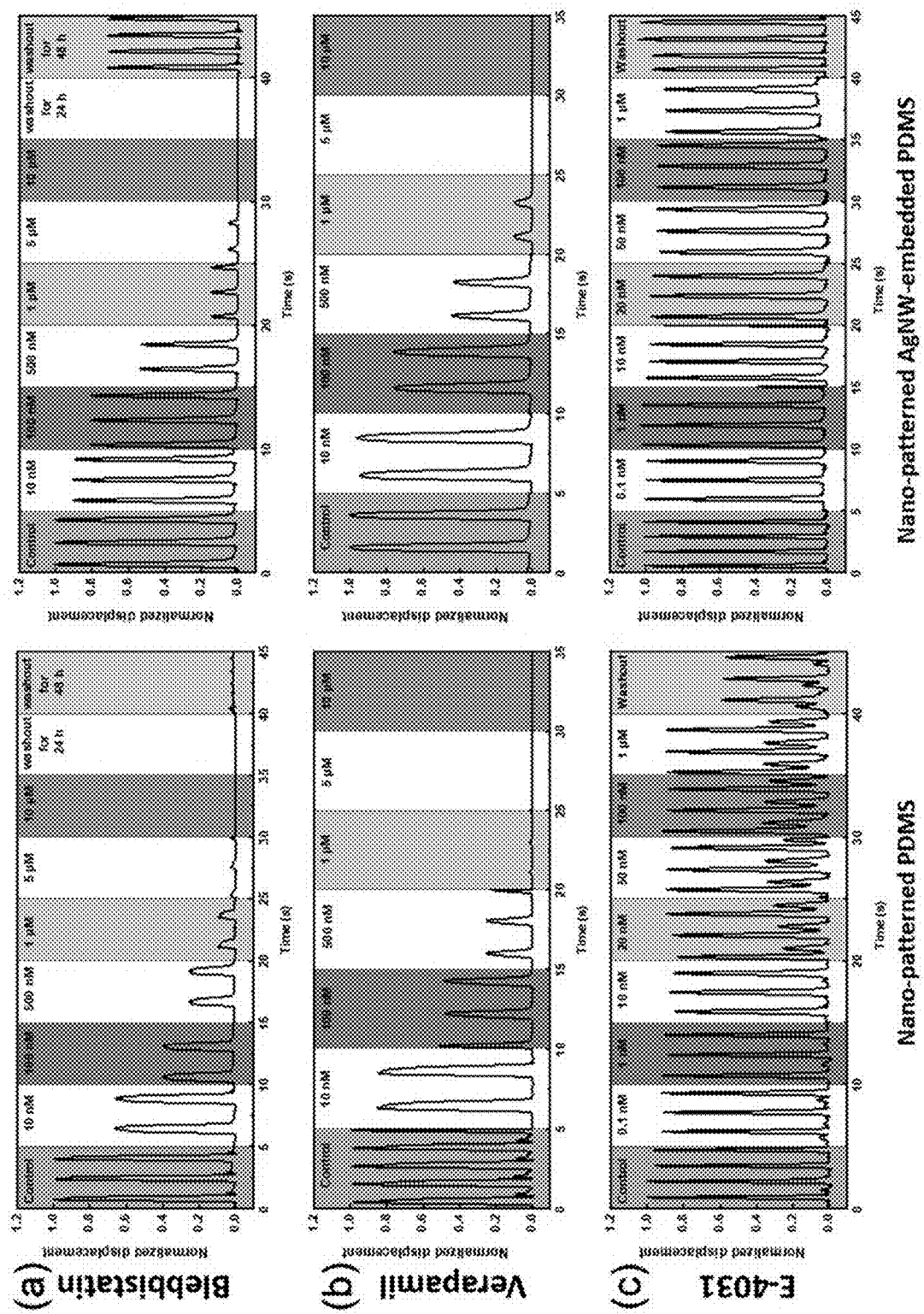
FIG. 19 shows graphs illustrating the drug screening results for human-induced pluripotent stem cell-cardiomyocytes (hiPSC-CMs).

As can be confirmed from FIG. 19, different responses of the immature and mature cardiomyocytes to different drugs were observed. The increasing concentration of blebbistatin significantly affected the contraction of cardiomyocytes cultured on bare PDMS ((a) of FIG. 19). In contrast, the cardiomyocytes cultured on embedded PDMS showed a gently decreasing tendency in contraction, similar to the results of the rat experiment. The cultures contaminated with drugs were replaced, and after 48 h, the contraction force of cardiomyocytes was again measured. The contraction force of the cardiomyocytes cultured on bare PDMS did not return, but the contraction force of the cardiomyocytes cultured on embedded PDMS returned to 70% or more.

The drug response to verapamil was also measured. When the cardiomyocytes cultured on bare PDMS were treated with different concentrations of verapamil, the contraction force thereof was significantly reduced, and the beating completely disappeared by the treatment with 1 µM verapamil. However, the cardiomyocytes on the embedded PDMS showed higher resistance to verapamil, and showed comparatively less reduced contraction power despite the increase in the drug concentration ((b) of FIG. 19).

Lastly, the effect of E-4031 was also investigated. Initially, the cardiomyocytes showed a clear second beat for bare PDMS, and the second beat became more severe with increasing concentration. This graph indicates an asynchronous phenomenon caused by poor cell-to-cell communication. The cells cultured on embedded PDMS, compared with the cardiomyocytes cultured on bare PDMS, showed stable contraction behavior even after the treatment with a high concentration of drug while only a change in duration time was observed. However, the cardiomyocytes cultured on bare PDMS showed irregular beat behavior as the dose of the drug increased ((c) of FIG. 19).

Experimental Example 10: Comparison of NRVM and hiPSC-CM in Drug Test

There are several similarities and differences in the drug response between animal and human cardiomyocytes. The comparison results of drug response differences between neonatal rat ventricular myocytes (NRVMs) and human-induced pluripotent stem cell-cardiomyocytes (hiPSC-CMs) are shown in FIG. 20A to 20C.

Figure 20A:
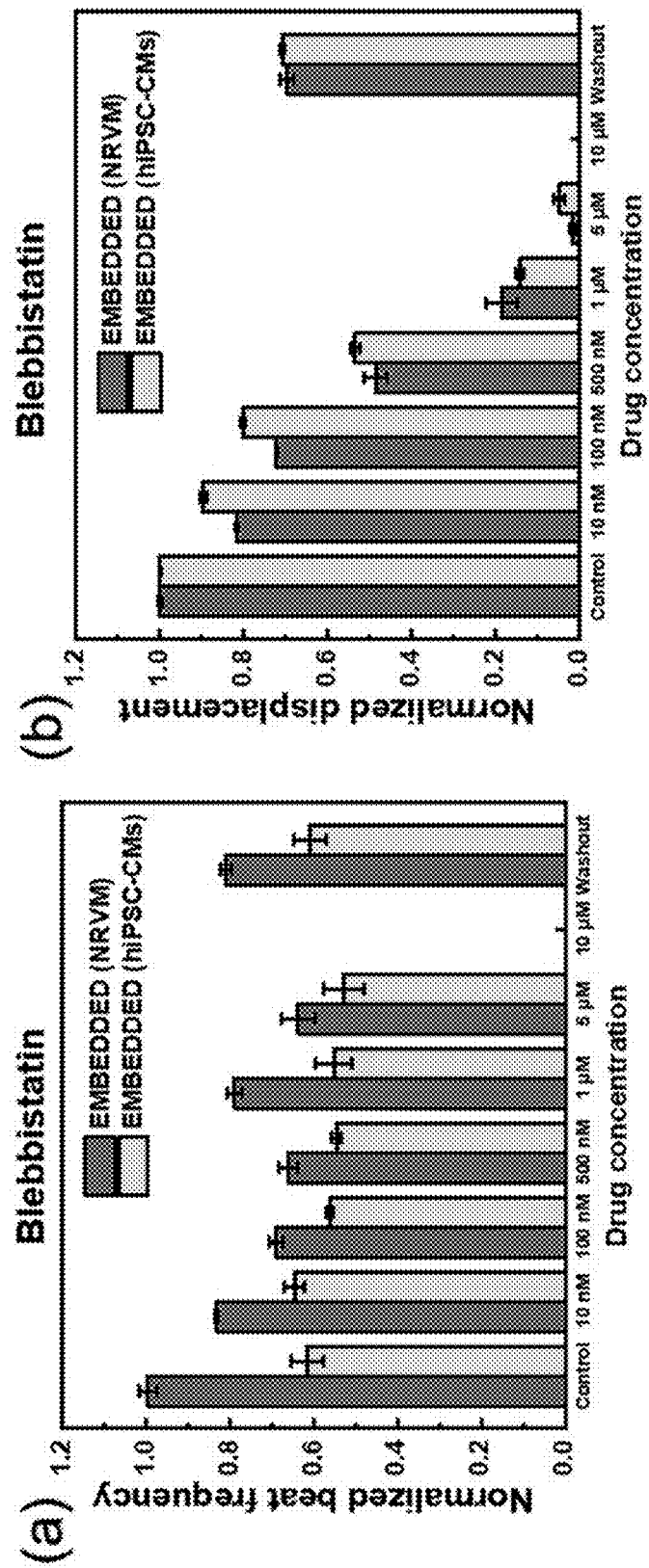
FIGS. 20A, 20B and 20C show graphs comparing the drug response difference between neonatal rat ventricular myocytes (NRVMs) and human-induced pluripotent stem cell-cardiomyocytes (hiPSC-CMs).

As can be confirmed from (a) of FIG. 20A, as the blebbistatin drug increased, the animal cells showed a tendency to decrease both beat frequency and contraction force, whereas the human cells showed a tendency to decrease only displacement. As can be confirmed from (b) of FIG. 20A, the decrease tendency before the IC50 value (about 1 µM) shows that the human cells had slightly higher durability than the animal cells.

Figure 20B:
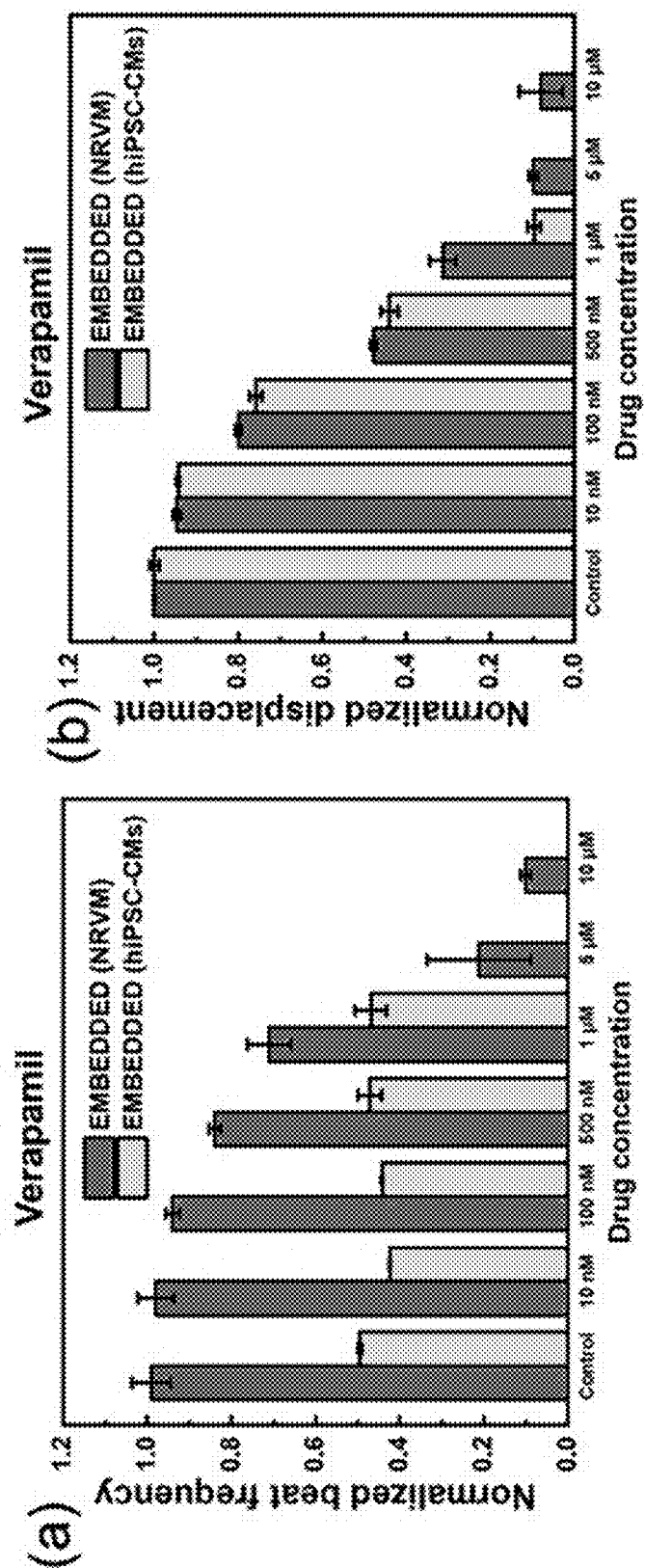
Figure 20C:
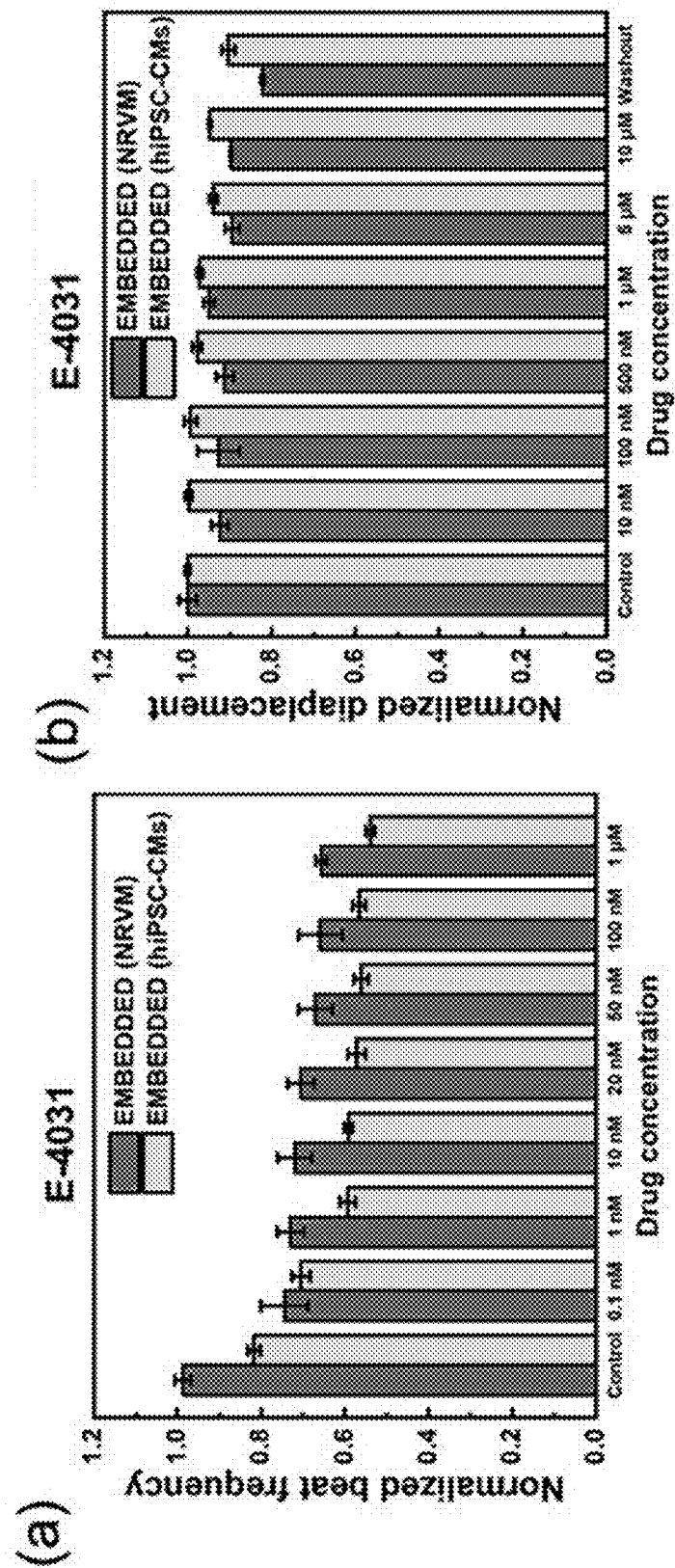

This was similar even when verapamil was used, as in (a) of FIG. 20B and (b) of FIG. 20B.

However, unlike the above-described two drugs, E-4031 showed a tendency to decrease the beat frequency in both animal cells and human cells ((a) of FIG. 2C). As shown in (b) of FIG. 20C, the reduction of contraction force was observed in the animal experiment, but the change in displacement was not observed in the human cells.

Ultimately, it could be concluded that NRVMs and hiPSC-CMs showed different responses in drug experiments due to different species specificity thereof, and further studies need to be conducted to understand specific biological characteristics.

What is claimed is:

1. A method for manufacturing a conductive polymer substrate, the method comprising:
    a first preparation step of preparing a first mold including a nanopatterned layer with a predetermined pitch distance on a surface thereof;
    a second preparation step of bringing the first mold into contact with a first polymer material, followed by detachment of the first mold, so as to allow the first polymer material to have nanopatterns corresponding to nanopatterns of the first mold, and then curing the first polymer material to prepare a second mold having transferred nanopatterns;
    a third preparation step of bringing the second mold into contact with a second polymer material, followed by detachment of the second mold, so as to allow the second material to have nanopatterns corresponding to the nanopatterns of the second mold, and then curing the second polymer material to prepare a polymer substrate having transferred nanopatterns;
    a first coating step of spin-coating a conductive material on the polymer substrate having a nanopatterned layer on one side of the polymer substrate;
    a second coating step of spin-coating a first polymer material on the conductive material-spin-coated side of the polymer substrate so as to allow the conductive material to be embedded in the first polymer material; and
    a removal step of removing the polymer substrate.

2. The method of claim 1, wherein the nanopatterns has a shape in which pitches and grooves are alternatingly arranged.

3. The method of claim 1, wherein the pitch distance is 400 to 1,200 nm.

4. The method of claim 1, wherein the first polymer material is one selected from the group consisting of polydimethylsiloxane (PDMS)-based polymers, polymethyl methacrylate (PMMA), polyurethane acrylate (PUA), polystyrene (PS), polycarbonate (PC), polyvinyl alcohol (PVA), cyclic olefin copolymer (COP), polyethylene terephthalate (PET), polyvinyl butadiene (PVB), and copolymers thereof.

5. The method of claim 1, wherein the second polymer material is one selected from the group consisting of polydimethylsiloxane (PDMS)-based polymers, polymethyl methacrylate (PMMA), polyurethane acrylate (PUA), polystyrene (PS), polycarbonate (PC), polyvinyl alcohol (PVA), cyclic olefin copolymer (COP), polyethylene terephthalate (PET), polyvinyl butadiene (PVB), and copolymers thereof.

6. The method of claim 1, wherein the first coating step is performed by primary spin coating at 400 to 600 rpm for 5 to 15 sec and then secondary spin coating at 2,500 to 3,500 rpm for 20 to 40 sec.

7. The method of claim 1, wherein the first coating step is performed at least two times.

8. The method of claim 1, wherein the conductive material is one selected from the group consisting of silver nanowires, copper nanowires, and gold nanowires.

9. The method of claim 1, wherein the second coating step is performed at 500 to 900 rpm for 30 to 50 sec.

10. The method of claim 1, wherein the removal step is performed by soaking in deionized water the polymer substrate having the conductive material and the first polymer material sequentially laminated therein.

* * * * *